US011358476B2

United States Patent
Matsubara et al.

(10) Patent No.: US 11,358,476 B2
(45) Date of Patent: Jun. 14, 2022

(54) DRIVE DEVICE AND VEHICLE

(71) Applicant: DENSO CORPORATION, Kariya (JP)

(72) Inventors: Kiyotaka Matsubara, Ichinomiya (JP); Kenji Yamada, Komaki (JP); Toshihiro Yamamoto, Toyohashi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 734 days.

(21) Appl. No.: 15/724,520

(22) Filed: Oct. 4, 2017

(65) Prior Publication Data
US 2018/0105064 A1   Apr. 19, 2018

(30) Foreign Application Priority Data

Oct. 19, 2016   (JP) .............................. JP2016-205427

(51) Int. Cl.
*H02P 21/04*   (2006.01)
*H02P 6/14*   (2016.01)
(Continued)

(52) U.S. Cl.
CPC .............. *B60L 15/20* (2013.01); *B60K 6/445* (2013.01); *B60L 15/007* (2013.01); *B60W 20/10* (2013.01);
(Continued)

(58) Field of Classification Search
CPC .............. H02P 29/68; H02P 6/24; H02M 7/44
See application file for complete search history.

(56) References Cited

U.S. PATENT DOCUMENTS

| 2011/0193509 A1* | 8/2011 | Ooyama | ................. H02M 1/12 |
| | | | 318/503 |
| 2013/0200830 A1 | 8/2013 | Suzuki et al. | |

(Continued)

FOREIGN PATENT DOCUMENTS

| JP | 2008-54466 | 3/2008 |
| JP | 2013-162660 | 8/2013 |

(Continued)

OTHER PUBLICATIONS

U.S. Appl. No. 15/496,236, "Vehicle", filed Apr. 25, 2017.
U.S. Appl. No. 15/493,254, "Vehicle", filed Apr. 21, 2017.

*Primary Examiner* — Muhammad S Islam
*Assistant Examiner* — Charles S Laughlin
(74) *Attorney, Agent, or Firm* — Finnegan, Henderson, Farabow, Garrett & Dunner, LLP

(57) ABSTRACT

A drive device includes a motor, an inverter, an electric power storage device, and an electronic control unit. The electronic control unit is configured to generate a first pulse width modulation (PWM) signal of the switching elements by comparison of a voltage command of each phase according to a torque command of the motor and a carrier wave voltage, as a first PWM control. The electronic control unit is configured to generate a second PWM signal of the switching elements based on a modulation factor and a voltage phase of a voltage according to the torque command and a pulse count per unit cycle of an electric angle of the motor, as a second pulse width modulation control. The electronic control unit is configured to limit execution of the second PWM control when high controllability of the motor is requested rather than when the high controllability is not requested.

8 Claims, 12 Drawing Sheets

(51) Int. Cl.

| | | |
|---|---|---|
| *H02P 6/15* | (2016.01) | |
| *B60L 15/20* | (2006.01) | |
| *B60W 20/10* | (2016.01) | |
| *B60W 20/40* | (2016.01) | |
| *F02N 11/08* | (2006.01) | |
| *H02K 7/116* | (2006.01) | |
| *H02P 6/28* | (2016.01) | |
| *H02P 6/04* | (2016.01) | |
| *H02P 27/08* | (2006.01) | |
| *B60K 6/445* | (2007.10) | |
| *B60L 15/00* | (2006.01) | |
| *B60K 6/26* | (2007.10) | |

(52) U.S. Cl.
CPC ......... *B60W 20/40* (2013.01); *F02N 11/0862* (2013.01); *H02K 7/116* (2013.01); *H02P 6/04* (2013.01); *H02P 6/28* (2016.02); *H02P 27/085* (2013.01); *B60K 6/26* (2013.01); *B60K 2006/268* (2013.01); *B60L 2210/14* (2013.01); *B60L 2210/40* (2013.01); *B60L 2240/423* (2013.01); *B60L 2240/427* (2013.01); *Y02T 10/64* (2013.01); *Y02T 10/72* (2013.01); *Y10S 903/906* (2013.01)

(56) References Cited

U.S. PATENT DOCUMENTS

2014/0139156 A1* 5/2014 Hayashi .................. B60L 15/06
318/400.3
2014/0309831 A1* 10/2014 Tanaka .................. B60W 10/08
701/22
2017/0264232 A1* 9/2017 Iezawa .................. H02P 29/032

FOREIGN PATENT DOCUMENTS

| JP | 2014-128098 A | 7/2014 |
|---|---|---|
| JP | 5594301 | 8/2014 |
| JP | 2015-53824 | 3/2015 |
| JP | 2016-5368 | 1/2016 |
| JP | 2016-5378 | 1/2016 |
| JP | 5986595 | 8/2016 |
| WO | WO 2015/125586 A1 | 8/2015 |

* cited by examiner

DRIVE DEVICE AND VEHICLE

INCORPORATION BY REFERENCE

The disclosure of Japanese Patent Application No. 2016-205427 filed on Oct. 19, 2016 including the specification, drawings and abstract is incorporated herein by reference in its entirety.

BACKGROUND

1. Technical Field

The present disclosure relates to a drive device and a vehicle, and in particular, a drive device including a motor, an inverter, and an electric power storage device, and a vehicle in which the drive device is mounted.

2. Description of Related Art

In the related art, as a drive device, a drive device that includes an electric motor, and an electric power conversion device having an inverter circuit configured to drive the electric motor by switching a plurality of switching elements, generates a pulse signal of the switching elements based on a pulse count in one electrical cycle of the electric motor and a modulation factor and a voltage phase of a voltage according to a torque command of the electric motor, and switches the switching elements has been suggested (for example, see Japanese Unexamined Patent Application Publication No. 2013-162660 (JP 2013-162660 A)). In the drive device, the pulse signal is generated such that electric power loss of the electric power conversion device and the electric motor is minimized based on the pulse count, the modulation factor, and the voltage phase, thereby achieving reduction of loss of the entire drive device.

SUMMARY

In a method that generates the pulse signal and outputs the pulse signal to the electric power conversion device in the above-described drive device, it is considered that a switching frequency of the switching elements is set to be smaller than in a method that generates a pulse signal by comparison of a voltage command of each phase of an electric motor and a carrier wave voltage and outputs the pulse signal to an electric power conversion device. However, in a case where the switching frequency of the switching elements is set to be small, controllability of the electric motor is likely to be degraded. For this reason, there is a possibility that the controllability of the electric motor is further degraded for any reason or there is a request for further enhancing the controllability of the electric motor, and accordingly, there is a possibility that the request is not satisfied when high controllability of the electric motor is requested.

The present disclosure provides a drive device and a vehicle that sufficiently satisfy a request for controllability.

Aspects of the present disclosure are as follows.

A first aspect of the present disclosure relates to a drive device including a motor for traveling, an inverter, an electric power storage device, and an electronic control unit. The inverter is configured to drive the motor by switching a plurality of switching elements. The electric power storage device is configured to transmit and receive electric power to and from the motor through the inverter. The electronic control unit is configured to generate a first pulse width modulation (PWM) signal of the switching elements by comparison of a voltage command of each phase according to a torque command of the motor and a carrier wave voltage and switch the switching elements with the first PWM signal, as a first PWM control. The electronic control unit is configured to generate a second PWM signal of the switching elements based on a modulation factor and a voltage phase of a voltage according to the torque command and a pulse count per unit cycle of an electric angle of the motor and switch the switching elements with the second pulse width modulation signal, as a second pulse width modulation control. A switching frequency of the switching elements in the second PWM control is set to be smaller than a switching frequency of the switching elements in the first PWM control. The electronic control unit is configured to limit execution of the second PWM control when high controllability of the motor is requested rather than when the high controllability is not requested.

With the drive device of the first aspect, the execution of the second PWM control is limited when the high controllability of the motor is requested rather than when the high controllability is not requested. Since the second PWM control has the switching frequency of the switching elements set to be smaller than in the first PWM control, the controllability of the motor is likely to be degraded. Accordingly, the execution of the second PWM control as the control of the inverter is limited when the high controllability of the motor is requested rather than when the high controllability is not requested. With this, it is possible to sufficiently satisfy the request for the high controllability of the motor. As the "limitation of the execution of the second PWM control", reduction of an execution area of the second PWM control, inhibition of the execution of the second PWM control, or the like can be exemplified.

In the drive device according to the first aspect, the electronic control unit may be configured to permit the execution of the second PWM control when the high controllability is not requested, and to inhibit the execution of the second PWM control when the high controllability is requested. With this, it is possible to determine the execution or inhibition of the second PWM control according to whether or not the high controllability of the motor is requested. In this case, the electronic control unit may be configured to execute the first PWM control when a target operation point of the motor is outside a predetermined area even in a case where the high controllability is not requested and the execution of the second PWM control is permitted. With this, it is possible to determine whether to permit or inhibit the execution of the second PWM control as the control of the inverter, and to determine which of the first PWM control and the second PWM control is to be executed according to the target operation point of the motor.

In the drive device according to the first aspect, the electronic control unit may be configured to generate the second PWM signal of the switching elements such that, in the second PWM control, a harmonic component of a desired order is reduced and a total loss of loss of the motor and loss of the inverter is reduced more than in the first PWM control. With this, in a case of executing the second PWM control, it is possible to achieve reduction of a harmonic component of a desired order or reduction of total loss more than in a case of executing the first PWM control. The "desired order" may be a specific order, or may be orders in a comparatively wide range of a low order to a high order.

The drive device according to the first aspect may further include a rotation position detection sensor configured to detect a rotation position of a rotor of the motor, and a current sensor configured to detect a current flowing in the motor. The electronic control unit may be configured to determine that the high controllability is requested when zero learning of at least one of the rotation position detection sensor and the current sensor is not completed. When the zero learning of the rotation position detection sensor or the current sensor is not completed, there is a possibility that the controllability of the motor is further degraded. Accordingly, when the zero learning of at least one of the rotation position detection sensor and the current sensor is not completed, determination is made that the high controllability is requested, and the execution of the second PWM control as the control of the inverter is limited. With this, it is possible to sufficiently satisfy the request for the high controllability of the motor.

The drive device according to the first aspect may further include a rotation position detection sensor configured to detect a rotation position of a rotor of the motor, and a current sensor configured to detect a current flowing in the motor. The electronic control unit may be configured to determine that the high controllability is requested when an abnormality occurs in at least one of the rotation position detection sensor and the current sensor. When an abnormality occurs in the rotation position detection sensor or the current sensor, there is a possibility that the controllability of the motor is further degraded. Accordingly, when an abnormality occurs in at least one of the rotation position detection sensor and the current sensor, determination is made that the high controllability is requested, and the execution of the second PWM control as the control of the inverter is limited. With this, it is possible to sufficiently satisfy the request for the high controllability of the motor.

In the drive device according to first aspect, the electronic control unit may be configured to determine that the high controllability is requested when an amount of change per unit time of at least one of the torque command of the motor, a rotation speed of the motor, a voltage of the inverter, and a voltage of the electric power storage device is greater than a corresponding threshold. When the torque command or the rotation speed of the motor, the voltage of the inverter, or the voltage of the electric power storage device is rapidly changed (when a drive state of the motor is rapidly changed), there is a possibility that the controllability of the motor is further degraded. Accordingly, when the torque command or the rotation speed of the motor, the voltage of the inverter, or the voltage of the electric power storage device is rapidly changed, determination is made that the high controllability is requested, and the execution of the second PWM control as the control of the inverter is limited. With this, it is possible to sufficiently satisfy the request for the high controllability of the motor.

In the drive device according to the first aspect, the electronic control unit may be configured to determine that the high controllability is requested when vibration damping control by the motor is performed. When the vibration damping control by the motor is performed, in order to sufficiently exhibit vibration damping performance, the controllability of the motor may be further enhanced (is requested to be further enhanced). Accordingly, when the vibration damping control by the motor is performed, determination is made that the high controllability is requested, and the execution of the second PWM control as the control of the inverter is limited. With this, it is possible to sufficiently satisfy the request for the high controllability of the motor.

The drive device according to the first aspect may further include a boost converter configured to boost electric power from the electric power storage device and to supply electric power to the inverter, a current sensor configured to detect a current flowing in a reactor of the boost converter, and a voltage sensor configured to detect a voltage on the inverter from the boost converter. The electronic control unit may be configured to determine that the high controllability is requested when an abnormality occurs in at least one of the current sensor and the voltage sensor. When an abnormality occurs in the current sensor or the voltage sensor, there is a possibility that the controllability of the motor is further degraded. Accordingly, when an abnormality occurs in at least one of the current sensor and the voltage sensor, determination is made that the high controllability is requested, and the execution of the second PWM control as the control of the inverter is limited. With this, it is possible to sufficiently satisfy the request for the high controllability of the motor.

A second aspect of the present disclosure relates to a vehicle including the drive device according to the first aspect, drive wheels, an engine, a power generator, an inverter for a power generator, and a relay. The drive wheels are connected to the motor and driven. The power generator is configured to generate electric power using power from the engine. The inverter for a power generator is configured to drive the power generator by switching a plurality of second switching elements. The relay is configured to perform connection and disconnection of the inverter and the inverter for a power generator to and from the electric power storage device. The electronic control unit is configured to control the inverter for a power generator by switching the first PWM control and the second PWM control. The electronic control unit is configured to determine that the high controllability of the motor and the power generator is requested in a case of performing traveling by disconnecting the inverter and the inverter for a power generator from the electric power storage device by the relay. The electronic control unit is configured to limit the execution of the second PWM control when the high controllability of the power generator is requested rather than when the high controllability is not requested. In a case of performing traveling by disconnecting the inverter and the inverter for a power generator from the electric power storage device by the relay, the sum of the electric power consumption (generated electric power) of the motor and the power generator cannot be absorbed with the electric power storage device. For this reason, the sum of the electric power consumption of the motor and the power generator needs to be adjusted with higher accuracy, and the controllability of the motor and the power generator needs to be further enhanced (is requested to be further enhanced). Accordingly, in a case of performing traveling by disconnecting the inverter and the inverter for a power generator from the electric power storage device by the relay, determination is made that the high controllability of the motor and the power generator is requested, and the execution of the second PWM control as the control of the inverter is limited. With this, it is possible to sufficiently satisfy the request for the high controllability of the motor.

A third aspect of the present disclosure relates to a vehicle including the drive device according to the first aspect, drive wheels, an engine, a motor generator, a planetary gear, and an inverter for a motor generator. The drive wheels are connected to the motor and driven. The planetary gear includes three rotating elements. The three rotating elements of the planetary gear are connected to an output shaft of the engine, a rotational shaft of the motor generator, and a drive shaft coupled to an axle, respectively. The inverter for a motor generator is configured to drive the motor generator by switching a plurality of second switching elements. The electric power storage device is connected to the motor and the motor generator through the inverter and the inverter for a motor generator so as to transmit and receive electric power to and from the motor and the motor generator. The electronic control unit is configured to control the inverter for a motor generator by switching the first PWM control and the second PWM control. The electronic control unit is configured to determine that the high controllability of the motor and the motor generator is requested in a case of starting the engine by cranking the engine with the motor generator. The electronic control unit is configured to limit the execution of the second PWM control when the high controllability of the motor generator is requested rather than when the high controllability is not requested. In a case of starting the engine by cranking the engine with the motor generator, the rotation speed or torque of the motor generator is changed comparatively largely, or the torque of the motor is rapidly changed in order to secure torque for traveling due to rapid change in torque output from the motor generator and applied to the drive shaft through the planetary gear. For this reason, there is a possibility that the controllability of the motor or the motor generator is further degraded. Accordingly, in a case of starting the engine by cranking the engine with the motor generator, determination is made that the high controllability is requested, and the execution of the second PWM control as the control of the inverter is limited. With this, it is possible to sufficiently satisfy the request for the high controllability of the motor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Next, a mode for carrying out the present disclosure will be described in connection with an example.

Figure 1:
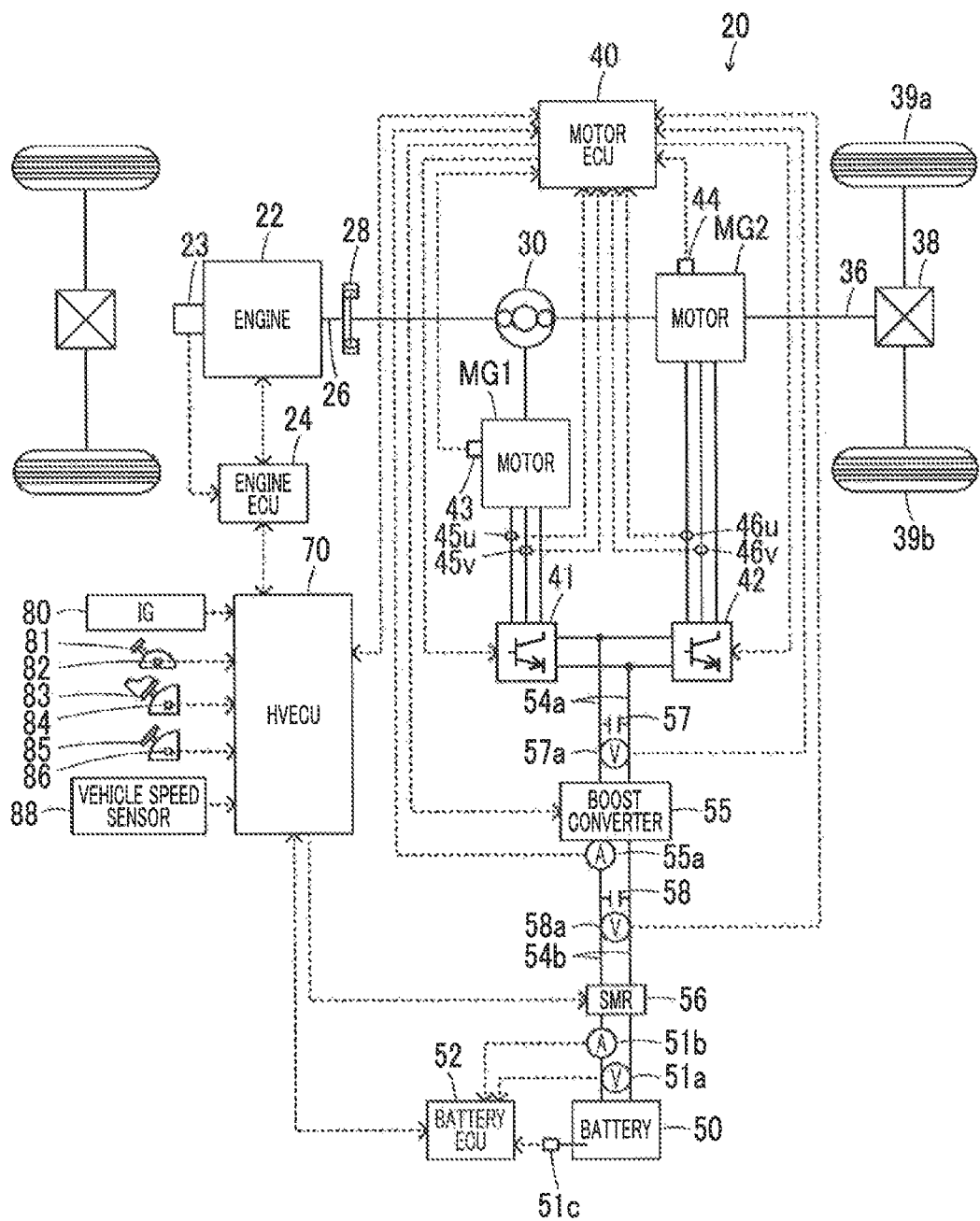
FIG. 1 is a configuration diagram showing the outline of the configuration of a hybrid vehicle in which a drive device of an example is mounted.
Figure 2:
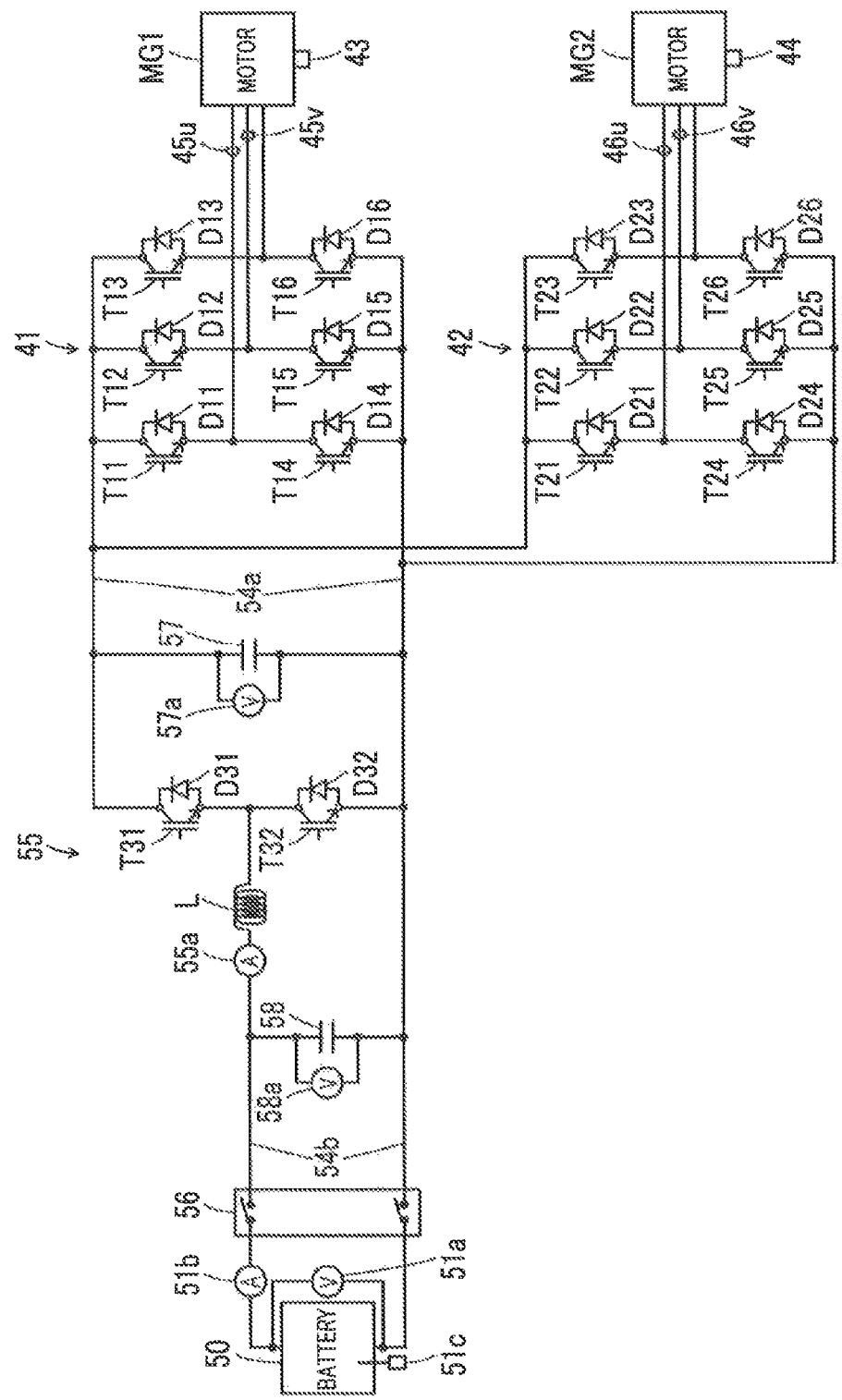
FIG. 2 is a configuration diagram showing the outline of the configuration of an electric drive system including a motor.

FIG. 1 is a configuration showing the outline of the configuration of a hybrid vehicle 20 in which a drive device as an example of the present disclosure is mounted. FIG. 2 is a configuration diagram showing the outline of the configuration of an electric drive system including motors MG1, MG2. As shown in FIG. 1, the hybrid vehicle 20 of the example includes an engine 22, a planetary gear 30, motors MG1, MG2, inverters 41, 42, a battery 50 as an electric power storage device, a boost converter 55, a system main relay 56, and an electronic control unit for hybrid (hereinafter, referred to as an "HVECU") 70.

The engine 22 is constituted as an internal combustion engine that outputs power with gasoline, diesel, or the like as fuel. The engine 22 is operated and controlled by an electronic control unit for an engine (hereinafter, referred to as an "engine ECU") 24.

Though not shown, the engine ECU 24 is constituted as a microprocessor centering on a CPU, and includes, in addition to the CPU, a ROM that stores a processing program, a RAM that temporarily stores data, an input/output port, and a communication port. Signals from various sensors for operating and controlling the engine 22, for example, a crank angle θcr from a crank position sensor 23 that detects a rotation position of a crankshaft 26 of the engine 22, and the like are input to the engine ECU 24 through the input port. Various control signals for operating and controlling the engine 22 are output from the engine ECU 24 through the output port. The engine ECU 24 is connected to the HVECU 70 through the communication port. The engine ECU 24 calculates a rotation speed Ne of the engine 22 based on the crank angle θcr from the crank position sensor 23.

The planetary gear 30 is constituted as a single-pinion type planetary gear mechanism. A rotor of the motor MG1 is connected to a sun gear of the planetary gear 30. A drive shaft 36 coupled to drive wheels 39a, 39b through a differential gear 38 is connected to a ring gear of the planetary gear 30. The crankshaft 26 of the engine 22 is connected to a carrier of the planetary gear 30 through a damper 28.

The motor MG1 is constituted as a synchronous motor generator having a rotor embedded with a permanent magnet and a stator wound with three-phase coils, and as described above, the rotor is connected to the sun gear of the planetary gear 30. Similarly to the motor MG1, the motor MG2 is constituted as a synchronous motor generator having a rotor embedded with a permanent magnet and a stator wound with three-phase coils, and the rotor is connected to the drive shaft 36.

As shown in FIG. 2, the inverter 41 is connected to a high voltage-side power line 54a. The inverter 41 has six transistors T11 to T16, and six diodes D11 to D16 connected in reversely parallel with the transistors T11 to T16. The transistors T11 to T16 are disposed in pairs so as to become a source side and a sink side with respect to a positive electrode-side line and a negative electrode-side line of the high voltage-side power line 54a. The three-phase coils (U-phase, V-phase, and W-phase) of the motor MG1 are connected to connection points between the paired transistors of the transistors T11 to T16, respectively. Accordingly, when a voltage is applied to the inverter 41, the ratio of the on time of the paired transistors of the transistors T11 to T16 is adjusted by an electronic control unit for a motor (hereinafter, referred to as a "motor ECU") 40. With this, a rotating magnetic field is formed in the three-phase coils, and the motor MG1 is rotationally driven. Similarly to the inverter 41, the inverter 42 is connected to the high voltage-side power line 54a, and has six transistors T21 to T26 and six diodes D21 to D26. Then, when a voltage is applied to the inverter 42, the ratio of the on time of the paired transistors of the transistors T21 to T26 is adjusted by the motor ECU 40. With this, a rotating magnetic field is formed in the three-phase coils, and the motor MG2 is rotationally driven.

The boost converter 55 is connected to the high voltage-side power line 54a, to which the inverters 41, 42 are connected, and a low voltage-side power line 54b to which the battery 50 is connected. The boost converter 55 has two transistors T31, T32, two diodes D31, D32 connected in reversely parallel with the transistors T31, T32, and a reactor L. The transistor T31 is connected to the positive electrode-side line of the high voltage-side power line 54a. The transistor T32 is connected to the transistor T31 and negative electrode-side lines of the high voltage-side power line 54a and the low voltage-side power line 54b. The reactor L is connected to a connection point between the transistors T31, T32 and a positive electrode-side line of the low voltage-side power line 54b. The ratio of the on time of the transistors T31, T32 is adjusted by the motor ECU 40, whereby the boost converter 55 boosts electric power of the low voltage-side power line 54b and supplies electric power to the high voltage-side power line 54a. The boost converter 55 deboosts electric power of the high voltage-side power line 54a and supplies electric power to the low voltage-side power line 54b. A smoothing capacitor 57 is attached to the positive electrode-side line and the negative electrode-side line of the high voltage-side power line 54a. A smoothing capacitor 58 is attached to the positive electrode-side line and the negative electrode-side line of the low voltage-side power line 54b.

Though not shown, the motor ECU 40 is constituted as a microprocessor centering on a CPU, and includes, in addition to the CPU, a ROM that stores a processing program, a RAM that temporarily stores data, an input/output port, and a communication port. As shown in FIG. 1, signals from various sensors for driving and controlling the motors MG1, MG2 or the boost converter 55 are input to the motor ECU 40 through the input port. As the signals that are input to the motor ECU 40, for example, rotation positions θm1, θm2 from rotation position detection sensors (for example, resolvers) 43, 44 that detect rotation positions of the rotors of the motors MG1, MG2, and phase currents Iu1, Iv1, Iu2, Iv2 from current sensors 45u, 45v, 46u, 46v that detect currents flowing in the phases of the motors MG1, MG2 can be exemplified. In addition, a voltage (a voltage of the high voltage-side power line 54a) VH of the capacitor 57 from a voltage sensor 57a attached between the terminals of the capacitor 57, a voltage (a voltage of the low voltage-side power line 54b) VL of the capacitor 58 from a voltage sensor 58a attached between the terminals of the capacitor 58, and a current IL flowing in the reactor L from a current sensor 55a attached to a terminal of the reactor L can be exemplified. A switching control signal to the transistors T11 to T16, T21 to T26 of the inverters 41, 42, a switching control signal to the transistors T31, T32 of the boost converter 55, and the like are output from the motor ECU 40 through the output port. The motor ECU 40 is connected to the HVECU 70 through the communication port. The motor ECU 40 calculates electric angles $\theta_{e1}$, $\theta_{e2}$, angular velocities ωm1, ωm2, and rotation speeds Nm1, Nm2 of the motors MG1, MG2 based on the rotation positions θm1, θm2 of the rotors of the motors MG1, MG2 from the rotation position detection sensors 43, 44.

The battery 50 is constituted as, for example, a lithium-ion secondary battery or a nickel-hydrogen secondary battery, and is connected to the low voltage-side power line 54b. The battery 50 is managed by an electronic control unit for a battery (hereinafter, referred to as a "battery ECU") 52.

Though not shown, the battery ECU 52 is constituted as a microprocessor centering on a CPU, and includes, in addition to the CPU, a ROM that stores a processing program, a RAM that temporarily stores data, an input/output port, and a communication port. Signals from various sensors for managing the battery 50 are input to the battery ECU 52 through the input port. As the signals that are input to the battery ECU 52, for example, a voltage Vb from a voltage sensor 51a provided between the terminals of the battery 50, a battery current Ib from a current sensor 51b attached to the output terminal of the battery 50, and a temperature Tb from a temperature sensor 51c attached to the battery 50 can be exemplified. The battery ECU 52 is connected to the HVECU 70 through the communication port. The battery ECU 52 calculates a state of charge SOC based on an integrated value of the battery current Ib from the current sensor 51b. The state of charge SOC is the ratio of the capacity of electric power dischargeable from the battery 50 to the total capacity of the battery 50.

The system main relay 56 is provided on the battery 50 side from the capacitor 58 in the low voltage-side power line 54b. The system main relay 56 is controlled to be turned on and off by the HVECU 70, thereby performing connection and disconnection of the battery 50 and the boost converter 55.

Though not shown, the HVECU 70 is constituted as a microprocessor centering on a CPU, and includes, in addition to the CPU, a ROM that stores a processing program, a RAM that temporarily stores data, an input/output port, and a communication port. Signals from various sensors are input to the HVECU 70 through the input port. As the signals that are input to the HVECU 70, for example, an ignition signal from an ignition switch 80 and a shift position SP from a shift position sensor 82 that detects an operation position of a shift lever 81 can be exemplified. In addition, an accelerator operation amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88 can be exemplified. The shift position SP includes a parking position (P position), a reverse position (R position), a neutral position (N position), a forward position (D position), and the like. As described above, the HVECU 70 is connected to the engine ECU 24, the motor ECU 40, and the battery ECU 52 through the communication port.

The hybrid vehicle 20 of the example configured as above travels in a hybrid traveling (HV traveling) mode in which traveling is performed with the operation of the engine 22, or in an electrically powered traveling (EV traveling) mode in which traveling is performed without the operation of the engine 22.

In the HV traveling mode, the HVECU 70 set requested torque Td* requested for traveling (requested for the drive shaft 36) based on the accelerator operation amount Acc and the vehicle speed V. Requested power Pd* requested for traveling (requested for the drive shaft 36) is calculated by multiplying the set requested torque Td* by a rotation speed Nd of the drive shaft 36 (the rotation speed Nm2 of the motor MG2). Subsequently, requested power Pe* requested for the vehicle (requested for the engine 22) is set by subtracting requested charge/discharge power Pb* (a positive value when electric power is discharged from the battery 50) based on the state of charge SOC of the battery 50 from the requested power Pd*. Next, a target rotation speed Ne* or target torque Te* of the engine 22 and the torque commands Tm1*, Tm2* of the motors MG1, MG2 are set such that the requested power Pe* is output from the engine 22 and the requested torque Td* is output from the drive shaft 36. Subsequently, a target voltage VH* of the high voltage-side power line 54a (capacitor 57) is set based on the torque commands Tm1*, Tm2* or the rotation speeds Nm1, Nm2 of the motors MG1, MG2. Then, the target rotation speed Ne* or the target torque Te* of the engine 22 is transmitted to the engine ECU 24, and the torque commands Tm1*, Tm2* of the motors MG1, MG2 or the target voltage VH* of the high voltage-side power line 54a is transmitted to the motor ECU 40. The engine ECU 24 performs intake air amount control, fuel injection control, ignition control, and the like of the engine 22 such that the engine 22 is operated based on the target rotation speed Ne* and the target torque Te*. The motor ECU 40 performs switching control of the transistors T11 to T16, T21 to T26 of the inverters 41, 42 such that the motors MG1, MG2 are driven with the torque commands Tm1*, Tm2*. In addition, the motor ECU 40 performs switching control of the transistors T31, T32 of the boost converter 55 such that the voltage VH of the high voltage-side power line 54a becomes the target voltage VH*. In the I-IV traveling mode, when a stop condition of the engine 22 is established, for example, when the requested power Pe* becomes equal to or less than a threshold for stop Pstop, the operation of the engine 22 is stopped and transition is made to the EV traveling mode.

In the EV traveling mode, the HVECU 70 sets the requested torque Td* based on the accelerator operation amount Acc and the vehicle speed V, sets the torque command Tm1* of the motor MG1 to a value 0, and sets the torque command Tm2* of the motor MG2 such that the requested torque Td* is output to the drive shaft 36. The target voltage VH* of the high voltage-side power line 54a is set based on the torque commands Tm1*, Tm2* or the rotation speeds Nm1, Nm2 of the motors MG1, MG2. Then, the torque commands Tm1*, Tm2* of the motors MG1, MG2 or the target voltage VH* of the high voltage-side power line 54a is transmitted to the motor ECU 40. The control of the inverters 41, 42 or the boost converter 55 by the motor ECU 40 has been described above. In the EV traveling mode, when a start condition of the engine 22 is established, for example, when the requested power Pe* calculated as in the HV traveling mode becomes equal to or less than a threshold for start Pstart greater than the threshold for stop Pstop, the engine 22 is started and transition is made to the HV traveling mode.

The start of the engine 22 is performed as follows through cooperative control of the HVECU 70, the engine ECU 24, and the motor ECU 40. First, torque that is the sum of cranking torque for cranking the engine 22 is output from the motor MG1, and cancel torque for cancelling torque applied to the drive shaft 36 along with the output of the cranking torque and requested torque Td* is output from the motor MG2, thereby cranking the engine 22. Then, when the rotation speed Ne of the engine 22 becomes equal to or higher than a predetermined rotation speed (for example, 500 rpm, 600 rpm, 700 rpm, or the like), the operation (fuel injection control, ignition control, and the like) of the engine 22 starts.

The control of the inverters 41, 42 will be described. In the example, the inverters 41, 42 switch (set one of first PWM control and second PWM control as control for execution) and execute first PWM control and second PWM control. The first PWM control is control for generating a first PWM signal of the transistors T11 to T16, T21 to T26 by comparison of a voltage command of each phase of the motors MG1, MG2 and a carrier wave voltage (triangular wave voltage) and switching the transistors T11 to T16, T21 to T26. The second PWM control is control for generating a second PWM signal of the transistors T11 to T16, T21 to T26 based on modulation factors Rm1, Rm2 and voltage phases θp1, θp2 of a voltage and pulse counts Np1, Np2 per unit cycle (for example, a half cycle, one cycle, or the like of the electric angle of the motors MG1, MG2) and switching the transistors T11 to T16, T21 to T26. In the second PWM control, the pulse counts Np1, Np2 are set such that a switching frequency of the transistors T11 to T16, T21 to T26 becomes smaller than that in the first PWM control. In the first PWM control, the first PWM signal is generated at an interval Δt1 corresponding to the half cycle, one cycle, or the like of the carrier wave voltage (a triangular wave voltage having a frequency of about 3 kHz to 5 kHz). In the second PWM control, the second PWM signal is generated at an interval Δt2 longer than the interval Δt1.

A generation method of the second PWM signal of the transistors T11 to T16 in the second PWM control of the inverter 41 will be described. As the generation method of the second PWM signal, for example, a first method, a second method, and a third method described below can be exemplified. A generation method of the second PWM signal of the transistors T21 to T26 in the second PWM control of the inverter 42 can be considered as for the inverter 41.

As the first method, a method that generates the second PWM signal such that a low-order harmonic component is reduced more than in the first PWM control can be exemplified. In this method, the second PWM signal of a pulse waveform (switching pattern) having half-wave symmetry [f(ωm1·t)=−f(ωm1·t+π)] and odd symmetry [f(ωm1·t)=f(π−ωm1·t)] is generated in consideration of the low-order harmonic component. Here, "ωm1" is a rotational angular velocity of the motor MG1, and "t" is time. With this, it is possible to reduce loss of the motor MG1 while reducing a low-order harmonic component. In the first method, when the motor MG1 is in a state of low rotation and low load (low torque), a reduction effect of loss of the motor MG1 by suppression of a low-order harmonic component is small. In addition, a harmonic component other than a target harmonic component increases due to suppression of a low-order harmonic component and iron loss of the motor increases.

As the second method, a method that the second PWM signal is generated such that eddy current loss of the motor MG1 is reduced more than in the first PWM control can be exemplified. In this method, the second PWM signal of a pulse waveform (switching pattern) having half-wave symmetry $[f(\omega m1 \cdot t) = -f(\omega m1 \cdot t + \pi)]$ is generated in consideration of not only a low-order harmonic component but also a high-order harmonic component. An advantage of employing such a pulse waveform is that the range of selection of a pulse waveform is wider than the pulse waveform used in the first method, and improvement of controllability of both of amplitude and phase of a frequency component included in the second PWM signal is expected.

The pulse waveform of the second PWM signal in the second method can be represented as Expression (1) in a case where Fourier series expansion is used. In Expression (1), "$\theta_{e1,m}$" is an m-th switching position of the motor MG1. "$a_0$" is a direct-current component. "n" is 1, 5, 7, 11, 13, . . . (odd integer). "M" is a switching frequency of the transistors T11 to T16 per unit cycle of an electric angle $\theta_{e1}$ of the motor MG1. The relationship between the switching frequency M and the pulse count Np1 becomes "M=Np1−1". Amplitude $C_n$ and phase $\alpha_n$ of each order can be obtained using a coefficient $a_n$ and a coefficient $b_n$ in Expression (1) by Expression (2). In the second method, the second PWM signal is generated using the amplitude $C_n$, phase $\alpha_n$, or the like of each order such that eddy current loss of the motor MG1 is reduced. On the other hand, iron loss $W_i$ of the motor MG1 can be represented by Expression (3) as a Steinmetz experimental formula. In Expression (3), "$W_h$" is hysteresis loss of motor MG1. "$W_e$" is eddy current loss of the motor MG1. "$K_h$" is a hysteresis loss coefficient. "$B_m$" is magnetic flux density. "$f_{m1}$" is a rotating magnetic flux frequency of the motor MG1. "$K_e$" is an eddy current loss coefficient of the motor MG1. Accordingly, in the second method, in more detail, eddy current loss that is a high proportion in iron loss of the motor MG1 is focused, and the second PWM signal is generated with eddy current loss as an evaluation function such that the evaluation function becomes minimum (eddy current loss in iron loss of the motor MG1 becomes minimum). With this, it is possible to further reduce loss of the motor MG1 while reducing harmonic components of low-order harmonics to high-order harmonics.

$$f(\theta_{e1}) = \frac{a_0}{2} + \sum_{n=1}^{\infty}(a_n \cos n\theta_{e1} + b_n \sin n\theta_{e1}) \quad (1)$$

$$a_n = \frac{1}{\pi}\int_0^{2\pi} f(\theta_{e1})\cos n\theta_{e1} d\theta_{e1} = -\frac{2}{n\pi}\sum_{m=1}^{M}(-1)^m \sin n\theta_{e1,m}$$

$$b_n = \frac{1}{\pi}\int_0^{2\pi} f(\theta_{e1})\sin n\theta_{e1} d\theta_{e1} = \frac{2}{n\pi}\left\{\left(\sum_{m=1}^{M}(-1)^m \cos n\theta_{e1,m}\right) + 1\right\}$$

$$C_n = \sqrt{a_n^2 + b_n^2}$$

$$\alpha_n = \tan^{-1}\frac{b_n}{a_n} \quad (2)$$

$$W_i = W_h + W_e = K_h B_m^2 f_{m1} + K_e B_m^2 f_{m1} \quad (3)$$

Figure 3:
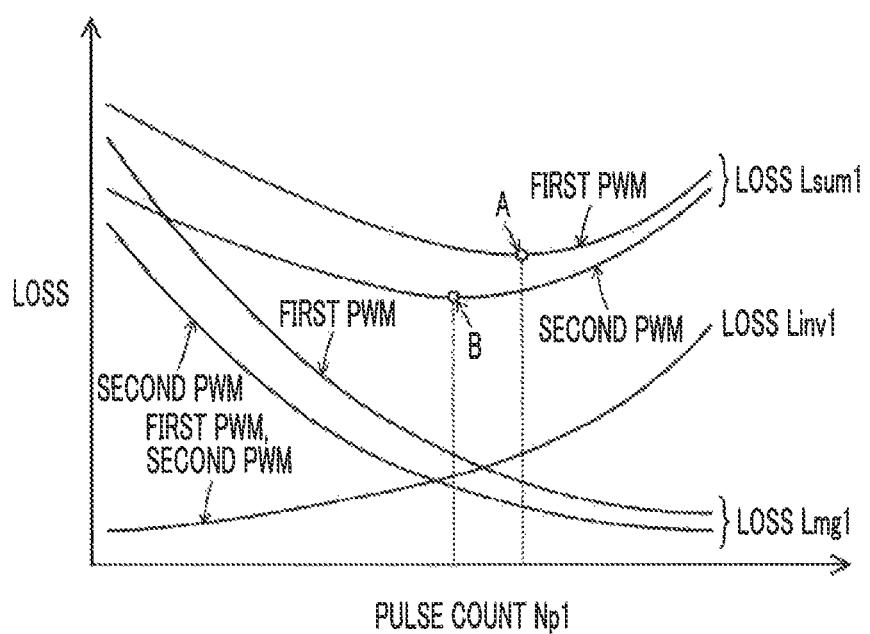
FIG. 3 is an explanatory view showing an example of the relationship between a pulse count in first PWM control and second PWM control, and total loss of loss of the motor and loss of an inverter.

As the third method, a method that generates the second PWM signal such that total loss Lsum1 of loss Lmg1 of the motor MG1 and loss Linv1 of the inverter 41 is reduced can be exemplified. FIG. 3 is an explanatory view showing an example of the relationship between the pulse count Np1 in the first PWM control and the second PWM control and the total loss Lsum1 of the loss Lmg1 of the motor MG1 and the loss Linv1 of the inverter 41. In the drawing, a point A is the pulse count Np1 where the total loss Lsum1 in the first PWM control becomes minimum, and a point B is the pulse count Np1 where the total loss Lsum1 in the second PWM control becomes minimum. The inventors have found from an experiment or an analysis that, in order to further reduce the total loss Lsum1 compared to the first method or the second method, as shown in FIG. 3, the pulse count Np1 should be used such that the switching frequency of the transistors T1 to T16 of the inverter 41 becomes smaller than that in the first PWM control. Accordingly, in the third method, the second PWM signal is generated such that harmonic components of low-order harmonics to high-order harmonics are reduced and the total loss Lsum1 is reduced compared to the first PWM control using the pulse count Np1 defined in this manner. With this, it is possible to further reduce the total loss Lsum1 while reducing harmonic components of low-order harmonics to high-order harmonics.

In the example, as the generation method of the second PWM signal of the transistors T11 to T16 in the second PWM control of the inverter 41, the third method among the first method, the second method, and the third method described above is used. The first method or the second method may be used.

In a case of executing the first PWM control, the switching frequency of the transistors T11 to T16, T21 to T26 increases and a generation cycle of a PWM signal is shortened compared to a case of executing the second PWM control. For this reason, it is possible to suppress an increase in noise (electromagnetic noise) due to switching of the transistors T21 to T26 or to enhance the controllability of the motors MG1, MG2. In a case of executing the second PWM control, electromagnetic noise is likely to increase or the controllability of the motors MG1, MG2 is likely to be degraded compared to a case of executing the first PWM control; however, it is possible to further reduce the total loss Lsum1 while reducing harmonic components of low-order harmonics to high-order harmonics.

Figure 4:
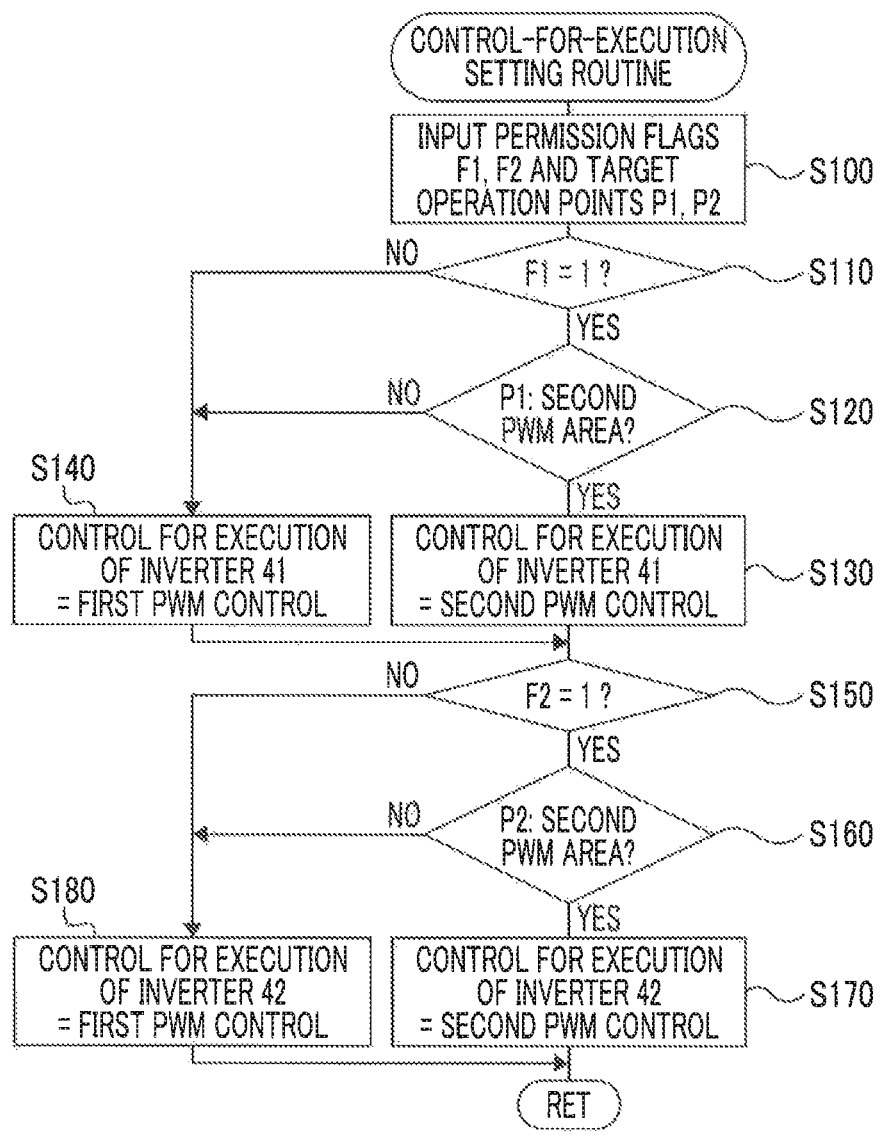
FIG. 4 is a flowchart showing an example of a control-for-execution setting routine that is executed by a motor ECU.

Next, the operation of the hybrid vehicle 20 of the example configured as above, and in particular, an operation in a case of setting the control for execution of the inverters 41, 42 from the first PWM control or the second PWM control will be described. FIG. 4 is a flowchart showing an example of a control-for-execution setting routine that is executed by the motor ECU 40. This routine is repeatedly executed.

In a case where the control-for-execution setting routine is executed, the motor ECU 40 first inputs data, such as permission flags F1, F2, a target operation point (rotation speed Nm1 and torque command Tm1*) P1 of the motor MG1, and a target operation point (rotation speed Nm2 and torque command Tm2*) P2 of the motor MG2, as input (Step S100). The permission flags F1, F2 are flags that are set to a value of 1 when the execution of the second PWM control as control of the inverters 41, 42 is permitted and are set to a value of 0 when the execution of the second PWM control as the control of the inverters 41, 42 is inhibited. The flags set through a permission flag setting routine FIG. 6 that is repeatedly executed in parallel with this routine are input. As the rotation speeds Nm1, Nm2 of the motors MG1, MG2, values calculated based on the rotation positions θm1, θm2 of the rotors of the motors MG1, MG2 from the rotation position detection sensors 43, 44 are input. As the torque commands Tm1*, Tm2* of the motors MG1, MG2, the values set through the above-described drive control are input.

Figure 5:
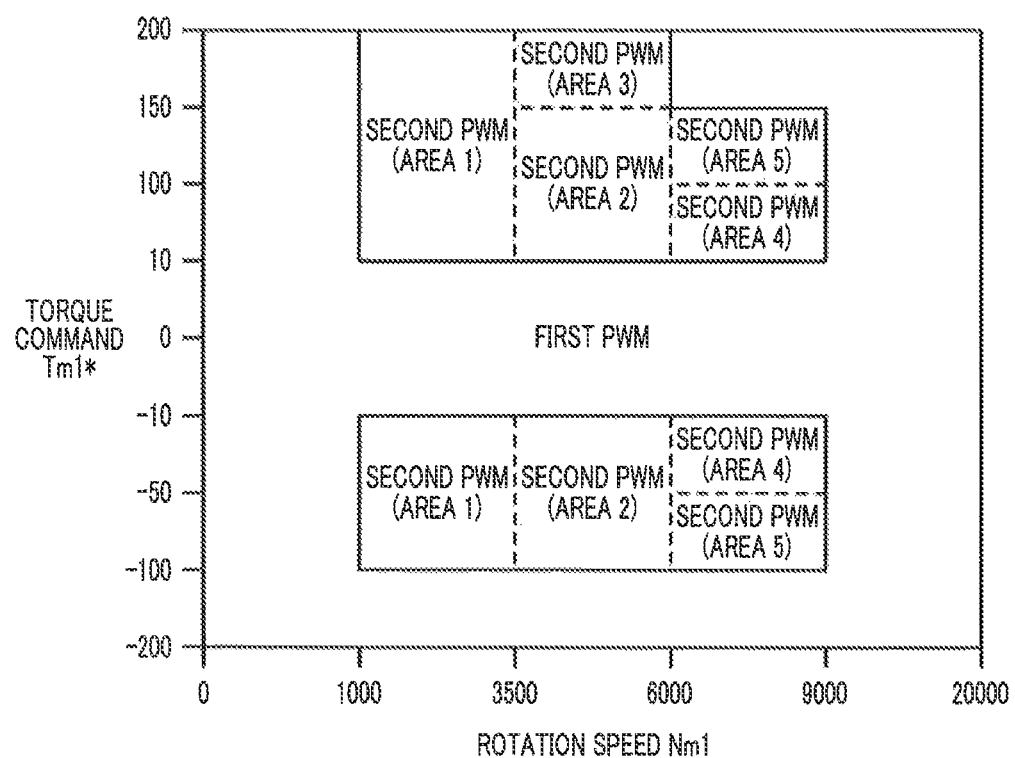
FIG. 5 is an explanatory view showing an example of the relationship between a target operation point of the motor, and an area of the first PWM control and an area of the second PWM control.

In a case where data is input in this manner, the value of the input permission flag F1 is examined (Step S110), and determination is made whether the target operation point P1 of the motor MG1 belongs to an area of the first PWM control or an area of the second PWM control (Step S120). FIG. 5 is an explanatory view showing an example of the relationship between the target operation point P1 of the motor MG1, and the area of the first PWM control and the area of the second PWM control. In the example, in regards to the area of the first PWM control and the area of the second PWM control for the target operation point P1 of the motor MG1, an area where an effect of the execution of the second PWM control is expected to some extent based on an experiment result or an analysis result of the execution of the first PWM control or the second PWM control on each target operation point P1 of the motor MG1 is defined as an area of the second PWM control. An area where the effect is not much expected is defined as an area of the first PWM control. In the example of FIG. 5, for the target operation point P1 of the motor MG1, the following areas 1 to 5 are set as the area of the second PWM control, and an area other than the area of the second PWM control is set as the area of the first PWM control. As the area 1, an area where the rotation speed Nm1 of the motor MG1 is 1000 rpm to 3500 rpm and the torque command Tm1* is equal to or greater than 10 Nm and an area where the rotation speed Nm1 is 1000 rpm to 3500 rpm and the torque command Tm1* is −100 Nm to −10 Nm are set. As the area 2, an area where the rotation speed Nm1 of the motor MG1 is 3500 rpm to 6000 rpm and the torque command Tm1* is 10 Nm to 150 Nm and an area where the rotation speed Nm1 is 3500 rpm to 6000 rpm and the torque command Tm1* is −100 Nm to −10 Nm are set. As the area 3, an area where the rotation speed Nm1 of the motor MG1 is 3500 rpm to 6000 rpm and the torque command Tm1* is equal to or greater than 150 Nm is set. As the area 4, an area where the rotation speed Nm1 of the motor MG1 is 6000 rpm to 9000 rpm and the torque command Tm1* is 10 Nm to 100 Nm and an area where the rotation speed Nm1 is 6000 rpm to 9000 rpm and the torque command Tm1* is −50 Nm to −10 Nm are set. As the area 5, an area where the rotation speed Nm1 of the motor MG1 is 6000 rpm to 9000 rpm and the torque command Tm1* is 100 Nm to 150 Nm and an area where the rotation speed Nm1 is 6000 rpm to 9000 rpm and the torque command Tm1* is −100 Nm to −50 Nm are set. In FIG. 5, the values of the rotation speed Nm1 of the motor MG1 or the torque command Tm1*, division between the area of the first PWM control and the area of the second PWM control, and division between the areas in the area of the second PWM control (including the number of areas) are merely illustrative, and may be appropriately set according to the specifications of the motor MG1, the inverter 41, and the like.

In Step S110, when the permission flag F1 is the value of 1, that is, when the execution of the second PWM control as the control of the inverter 41 is permitted, and in Step S120, when the target operation point P1 of the motor MG1 belongs to the area of the second PWM control, the second PWM control is set as the control for execution of the inverter 41 (Step S130). In Step S110, when the permission flag F1 is the value of 0, that is, when the execution of the second PWM control as the control of the inverter 41 is inhibited, or in Step S110, when the permission flag F1 is the value of 1, that is, when the execution of the second PWM control as the control of the inverter 41 is permitted, and in Step S120, when the target operation point P1 of the motor MG1 belongs to the area of the first PWM control, the first PWM control is set as the control for execution of the inverter 41 (Step S140).

Next, the value of the permission flag F2 is examined (Step S150), and determination is made whether the target operation point P2 of the motor MG2 belongs to the area of the first PWM control or the area of the second PWM control (Step S160). The area of the first PWM control and the area of the second PWM control for the target operation point P2 of the motor MG2 are set in the same manner as the area of the first PWM control and the area of the second PWM control for the target operation point P1 of the motor MG1.

In Step S150, when the permission flag F2 is the value of 1, that is, when the execution of the second PWM control as the control of the inverter 42 is permitted, and in Step S160, when the target operation point P2 of the motor MG2 belongs to the area of the second PWM control, the second PWM control is set as the control for execution of the inverter 42 (Step S170), and this routine ends. In Step S150, when the permission flag F2 is the value of 0, that is, when the execution of the second PWM control as the control of the inverter 42 is inhibited, or in Step S150, when the permission flag F2 is the value of 1, that is, when the execution of the second PWM control as the control of the inverter 42 is permitted, and in Step S160, when the target operation point P2 of the motor MG2 belongs to the area of the first PWM control, the first PWM control is set as the control for execution of the inverter 42 (Step S180), and this routine ends.

Next, a permission flag setting routine of FIG. 6 will be described. This routine is repeatedly executed in parallel with the control-for-execution setting routine of FIG. 4 by the motor ECU 40. In a case where the permission flag setting routine is executed, the motor ECU 40 first determines whether or not zero learning of the rotation position detection sensor 43 that detects the rotation position θm1 of the rotor of the motor MG1 or the current sensors 45u, 45v that detect the phase currents Iu1, Iv1 flowing in the motor MG1 is completed (Step S200).

In regard to the zero learning (learning of an offset amount) of the rotation position detection sensor 43, current commands of d-axis and q-axis are set as a value of 0 during the rotation of the motor MG1, and the offset amount of the rotation position θm1 of the rotor of the motor MG1 from the rotation position detection sensor 43 is adjusted such that a voltage command of d-axis at this time becomes a value of 0. The zero learning can be performed by storing the adjusted offset amount in the RAM (not shown), a flash memory, or the like. The zero learning (learning of an offset amount) of the current sensors 45u, 45v can be performed, for example, by storing the offset amounts of the phase currents Iu1, Iv1 of the motor MG1 current sensors 45u, 45v when the motor MG1 is stopped (a current does not flow in the three-phase coils of the motor MG1) in the RAM (not shown), a flash memory, or the like. The zero learning of the rotation position detection sensor 43 or the current sensors 45u, 45v can be performed in a frequency of, for example, once in one trip or several trips. Alternatively, the zero learning may be performed in a trip immediately after the rotation position detection sensor 43 or the current sensors 45u, 45v are replaced.

The processing of Step S200 can be performed, for example, by reading information regarding determination of the presence or absence of the zero learning of the rotation position detection sensor 43 or the current sensors 45u, 45v through a routine (not shown) and written in the RAM (not shown). The processing of Step S200 is processing for determining whether or not the high controllability of the motor MG1 is requested. When the zero learning of the rotation position detection sensor 43 or the current sensors 45u, 45v is not completed, there is a possibility that the rotation position θm1 of the rotor of the motor MG1 from the rotation position detection sensor 43 or the phase currents Iu1, Iv1 of the motor MG1 from the current sensors 45u, 45v are not correct values, and there is a possibility that the controllability of the motor MG1 is further degraded. Accordingly, in the example, determination is made whether or not the zero learning of the rotation position detection sensor 43 or the current sensors 45u, 45v is completed, thereby determining whether or not the high controllability of the motor MG1 is requested.

In Step S200, when the zero learning of the rotation position detection sensor 43 and the current sensors 45u, 45v is completed, determination is made that the high controllability of the motor MG1 is not requested (is secured in a needed level), and the value of 1 is set as the permission flag F1. That is, the execution of the second PWM control as the control of the inverter 41 is permitted (Step S210). In this case, in the control-for-execution setting routine of FIG. 4, the first PWM control or the second PWM control is set as the control for execution of the inverter 41 according to the target operation point P1 of the motor MG1.

When the zero learning of at least one of the rotation position detection sensor 43 and the current sensors 45u, 45v is not completed, determination is made that the high controllability of the motor MG1 is requested (there is a possibility that the controllability of the motor MG1 is further degraded), and the value of 0 is set as the permission flag F1. That is, the execution of the second PWM control as the control of the inverter 41 is inhibited (Step S220). In this case, in the control-for-execution setting routine of FIG. 4, the first PWM control is set as the control for execution of the inverter 41 regardless of the target operation point P1 of the motor MG1.

In a case where the permission flag F1 is set in this manner, subsequently, determination is made whether or not zero learning of the rotation position detection sensor 44 that detects the rotation position θm2 of the rotor of the motor MG2 or the current sensors 46u, 46v that detect the phase currents Iu2, Iv2 flowing in the motor MG2 is completed (Step S230). The zero learning (learning of an offset amount) of the rotation position detection sensor 44 or the current sensors 46u, 46v can be performed in the same manner as the zero learning of the rotation position detection sensor 43 or the current sensors 45u, 45v. The processing of Step S230 can be performed (determined) in the same manner as the processing of Step S200, except that the processing of Step S230 is processing for determining whether or not the high controllability of the motor MG2, not the motor MG1, is requested.

In Step S230, when the zero learning of the rotation position detection sensor 44 and the current sensors 46u, 46v is completed, determination is made that the high controllability of the motor MG2 is not requested (is secured in a needed level), and the value of 1 is set as the permission flag F2. That is, the execution of the second PWM control as the control of the inverter 42 is permitted (Step S240), and this routine ends. In this case, in the control-for-execution setting routine of FIG. 4, the first PWM control or the second PWM control is set as the control for execution of the inverter 42 according to the target operation point P2 of the motor MG2.

When the zero learning of at least one of the rotation position detection sensor 44 and the current sensors 46u, 46v is not completed, determination is made that the high controllability of the motor MG2 is requested (there is a possibility that the controllability of the motor MG2 is further degraded), and the value of 0 is set as the permission flag F2. That is, the execution of the second PWM control as the control of the inverter 42 is inhibited (Step S250), and this routine ends. In this case, in the control-for-execution setting routine of FIG. 4, the first PWM control is set as the control for execution of the inverter 42 regardless of the target operation point P2 of the motor MG2.

As described above, in a case of executing the second PWM control as the control of the inverter 41, the controllability of the motor MG1 is likely to be degraded compared to a case of executing the first PWM control. For this reason, in a case where the second PWM control is executed as the control of the inverter 41 when the zero learning of at least one of the rotation position detection sensor 43 and the current sensors 45u, 45v is not completed, there is a possibility that the controllability of the motor MG1 is further degraded and an overcurrent or an overvoltage occurs in the inverter 41. In the example, when the zero learning of at least one of the rotation position detection sensor 43 and the current sensors 45u, 45v is not completed, determination is made that the high controllability of the motor MG1 is requested (there is a possibility that the controllability of the motor MG1 is further degraded), and as the control of the inverter 41, the execution of the second PWM control is inhibited and the first PWM control is executed. With this, it is possible to more sufficiently satisfy a request for the high controllability of the motor MG1. Specifically, it is possible to suppress the occurrence of an overcurrent or an overvoltage in the inverter 41. The control of the inverter 42 can be considered similarly.

In the hybrid vehicle 20 of the example described above, when the zero learning of at least one of the rotation position detection sensor 43 and the current sensors 45u, 45v is not completed, determination is made that the high controllability of the motor MG1 is requested, and as the control of the inverter 41, the execution of the second PWM control is inhibited and the first PWM control is executed. Similarly, when the zero learning of at least one of the rotation position detection sensor 44 and the current sensors 46u, 46v is not completed, determination is made that the high controllability of the motor MG2 is requested, and as the control of the inverter 42, the execution of the second PWM control is inhibited and the first PWM control is executed. With this, it is possible to more sufficiently satisfy a request for the high controllability of the motors MG1, MG2.

Figure 6:
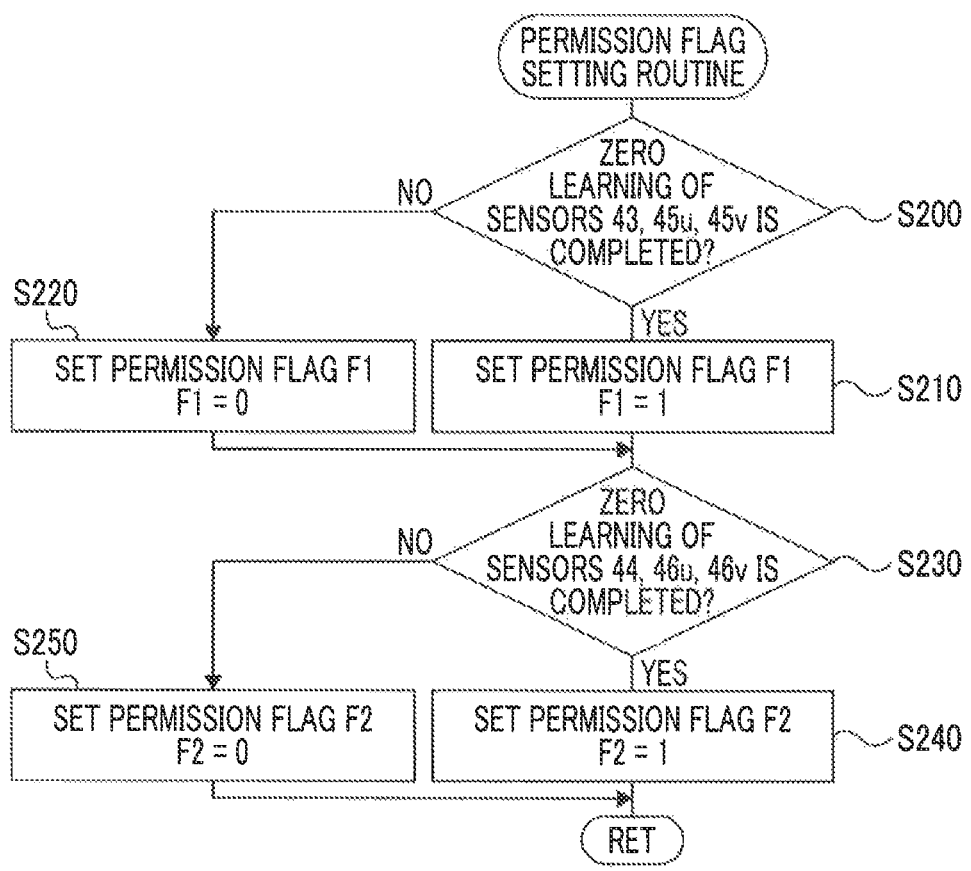
FIG. 6 is an explanatory view showing an example of a permission flag setting routine that is executed by the motor ECU.

In the hybrid vehicle 20 of the example, although the motor ECU 40 sets the permission flag F through the permission flag setting routine of FIG. 6, the motor ECU 40 may set the permission flag F through any one of permission flag setting routines of FIGS. 7 to 12. Hereinafter, the permission flag setting routines will be described in order.

Figure 7:
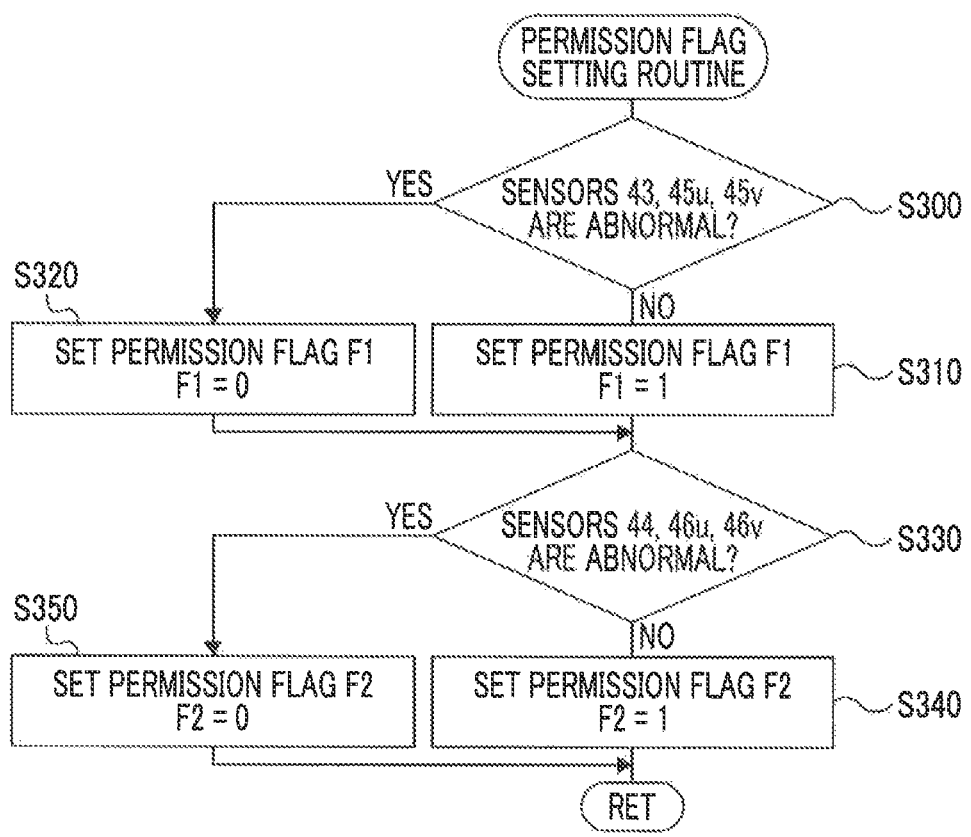
FIG. 7 is an explanatory view showing an example of a permission flag setting routine of a modification example.

First, the permission flag setting routine of FIG. 7 will be described. In a case where the permission flag setting routine of FIG. 7 is executed, the motor ECU 40 first determines whether or not an abnormality occurs in the rotation position detection sensor 43 that detects the rotation position θm1 of the rotor of the motor MG1 or the current sensors 45u, 45v that detect the phase currents Iu1, Iv1 flowing in the motor MG1 (Step S300). The processing of Step S300 can be performed, for example, by reading information regarding determination of the presence or absence of an abnormality in the rotation position detection sensor 43 or the current sensors 45u, 45v through a routine (not shown) and written in the RAM (not shown). Similarly to the processing of Step S200 of the permission flag setting routine of FIG. 6, the processing of Step S300 is processing for determining whether or not the high controllability of the motor MG1 is requested. When an abnormality occurs in the rotation position detection sensor 43 or the current sensors 45u, 45v, there is a possibility that the rotation position θm1 of the rotor of the motor MG1 from the rotation position detection sensor 43 of the phase currents Iu1, Iv1 of the motor MG1 from the current sensors 45u, 45v are not correct value or are not input, and there is a possibility that the controllability of the motor MG1 is further degraded. Accordingly, in this modification example, determination is made whether or not an abnormality occurs in the rotation position detection sensor 43 or the current sensors 45u, 45v, thereby determining whether or not the high controllability of the motor MG1 is requested.

In Step S300, when an abnormality does not occur in both of the rotation position detection sensor 43 and the current sensors 45u, 45v, determination is made that the high controllability of the motor MG1 is not requested (is secured in a needed level), and the value of 1 is set as the permission flag F1. That is, the execution of the second PWM control as the control of the inverter 41 is permitted (Step S310). When an abnormality occurs in at least one of the rotation position detection sensor 43 and the current sensors 45u, 45v, determination is made that the high controllability of the motor MG1 is requested (there is a possibility that the controllability of the motor MG1 is further degraded), and the value of 0 is set as the permission flag F1. That is, the execution of the second PWM control as the control of the inverter 41 is inhibited (Step S320).

In a case where the permission flag F1 is set in this manner, subsequently, determination is made whether or not an abnormality occurs in the rotation position detection sensor 44 that detects the rotation position θm2 of the rotor of the motor MG2 or the current sensors 46u, 46v that detect the phase currents Iu2, Iv2 flowing in the motor MG2 (Step S330). The processing of Step S330 can be performed (determined) in the same manner as the processing of Step S300, except that the processing of Step S330 is processing for determining whether or not the high controllability of the motor MG2, not the motor MG1, is requested.

In Step S330, when an abnormality does not occur in both of the rotation position detection sensor 44 and the current sensors 46u, 46v, determination is made that the high controllability of the motor MG2 is not requested (is secured in a needed level), and the value of 1 is set as the permission flag F2. That is, the execution of the second PWM control as the control of the inverter 42 is permitted (Step S340), and this routine ends. When an abnormality occurs in at least one of the rotation position detection sensor 44 and the current sensors 46u, 46v, determination is made that the high controllability of the motor MG2 is requested (there is a possibility that the controllability of the motor MG2 is further degraded), and the value of 0 is set as the permission flag F2. That is, the execution of the second PWM control as the control of the inverter 42 is inhibited (Step S350), and this routine ends.

As described above, in a case of executing the second PWM control as the control of the inverter 41, the controllability of the motor MG1 is likely to be degraded compared to a case of executing the first PWM control. For this reason, in a case where the second PWM control is executed as the control of the inverter 41 when an abnormality occurs in at least one of the rotation position detection sensor 43 and the current sensors 45u, 45v, there is a possibility that the controllability of the motor MG1 is further degraded and an overcurrent or an overvoltage occurs in the inverter 41. In this modification example, when an abnormality occurs in at least one of the rotation position detection sensor 43 and the current sensors 45u, 45v, determination is made that the high controllability of the motor MG1 is requested (there is a possibility that the controllability of the motor MG1 is further degraded), and as the control of the inverter 41, the execution of the second PWM control is inhibited and the first PWM control is executed. With this, it is possible to more sufficiently satisfy a request for the high controllability of the motor MG1. Specifically, it is possible to suppress the occurrence of an overcurrent or an overvoltage in the inverter 41. The control of the inverter 42 can be considered similarly.

Figure 8:
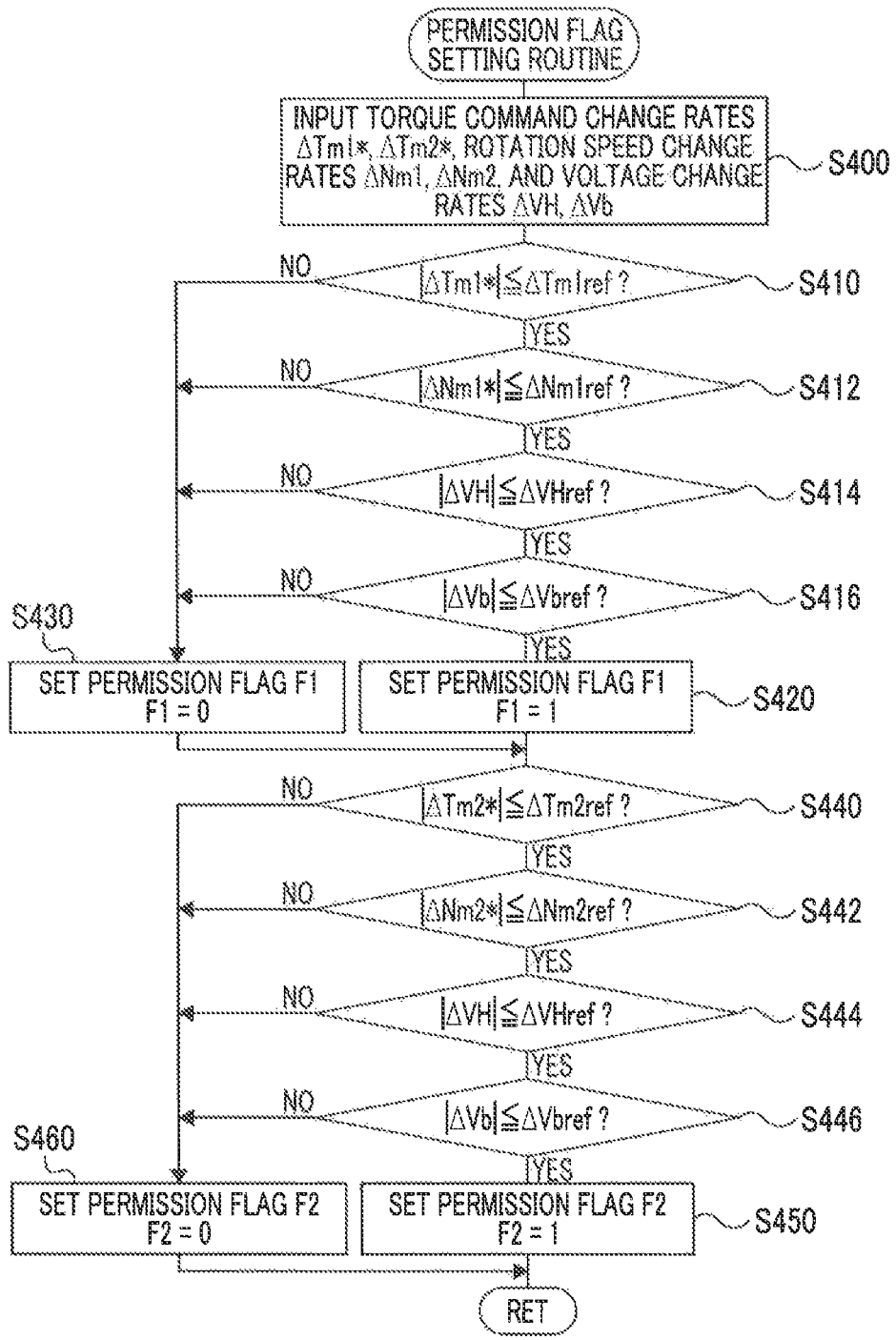
FIG. 8 is an explanatory view showing an example of a permission flag setting routine of a modification example.

Next, the permission flag setting routine of FIG. 8 will be described. In a case where the permission flag setting routine of FIG. 8 is executed, the motor ECU 40 first inputs data, such as torque command change rates $\Delta$Tm1*, $\Delta$Tm2* or rotation speed change rates $\Delta$Nm1, $\Delta$Nm2 of the motors MG1, MG2, a voltage change rate $\Delta$VH of the high voltage-side power line 54a, and a voltage change rate $\Delta$Vb of the battery 50 (Step S400). The torque command change rates $\Delta$Tm1*, $\Delta$Tm2* of the motors MG1, MG2 are the amounts of change per unit time of the torque commands Tm1*, Tm2* of the motors MG1, MG2. The rotation speed change rates $\Delta$Nm1, $\Delta$Nm2 of the motors MG1, MG2 are the amounts of change per unit time of the rotation speeds Nm1, Nm2 of the motors MG1, MG2. The voltage change rate $\Delta$VH of the high voltage-side power line 54a is the amount of change per unit time of the voltage VH of the high voltage-side power line 54a. The voltage change rate $\Delta$Vb of the battery 50 is the amount of change per unit time of the voltage Vb of the battery 50.

In a case where data is input in this manner, determination is made whether or not a drive state of the motor MG1 is rapidly changed (Steps S410 to S416). Specifically, an absolute value of the torque command change rate $\Delta$Tm1* of the motor MG1 is compared with a threshold $\Delta$Tm1ref, thereby determining whether or not the torque command Tm1* of the motor MG1 is rapidly changed (Step S410). An absolute value of the rotation speed change rate $\Delta$Nm1 of the motor MG1 is compared with a threshold $\Delta$Nm1ref, thereby determining whether or not the rotation speed Nm1 of the motor MG1 is rapidly changed (Step S412). An absolute value of the voltage change rate $\Delta$VH of the high voltage-side power line 54a is compared with a threshold $\Delta$VHref, thereby determining whether or not the voltage VH of the high voltage-side power line 54a is rapidly changed (Step S414). An absolute value of the voltage change rate $\Delta$Vb of the battery 50 is compared with a threshold $\Delta$Vbref, thereby determining whether or not the voltage Vb of the battery 50 is rapidly changed (Step S416).

Similarly to the processing of Step S200 of the permission flag setting routine of FIG. 6, the processing of Steps S410 to S416 is processing for determining whether or not the high controllability of the motor MG1 is requested. When the drive state of the motor MG1 is rapidly changed, there is a possibility that the controllability of the motor MG1 is further degraded. Accordingly, in this modification example, determination is made whether or not the drive state of the motor MG1 is rapidly changed, thereby determining whether or not the high controllability of the motor MG1 is requested. The thresholds $\Delta$Tm1ref, $\Delta$Nm1ref, $\Delta$VHref, $\Delta$Vbref can be appropriately set based on the specifications of the motor MG1, the inverter 41, the high voltage-side power line 54a, and the battery 50, or the like.

In Steps S410 to S416, when the absolute value of the torque command change rate $\Delta$Tm1* is equal to or less than the threshold $\Delta$Tm1ref, the absolute value of the rotation speed change rate $\Delta$Nm1 is equal to or less than the threshold $\Delta$Nm ref, the absolute value of the voltage change rate ΔVH is equal to or less than the threshold ΔVHref, and the absolute value of the voltage change rate ΔVb is equal to or less than the threshold ΔVbref, that is, when the drive state of the motor MG1 is not rapidly changed, determination is made that the high controllability of the motor MG1 is not requested (is secured in a needed level), and the value of 1 is set as the permission flag F1. That is, the execution of the second PWM control as the control of the inverter 41 is permitted (Step S420).

When the absolute value of the torque command change rate ΔTm1* is greater than the threshold ΔTm1ref, when the absolute value of the rotation speed change rate ΔNm1 is greater than the threshold ΔNm1ref, when the absolute value of the voltage change rate ΔVH is greater than the threshold ΔVHref, or when the absolute value of the voltage change rate ΔVb is greater than the threshold ΔVbref, that is, when the drive state of the motor MG1 is rapidly changed, the determination is made that the high controllability of the motor MG1 is requested (there is a possibility that the controllability of the motor MG1 is further degraded), and the value of 0 is set as the permission flag F1. That is, the execution of the second PWM control as the control of the inverter 41 is inhibited (Step S430).

In a case where the permission flag F1 is set in this manner, subsequently, determination is made whether or not the drive state of the motor MG2 is rapidly changed (Steps S440 to S446). Specifically, an absolute value of the torque command change rate ΔTm2* of the motor MG2 is compared with a threshold ΔTm2ref, thereby determining whether or not the torque command Tm2* of the motor MG2 is rapidly changed (Step S440). An absolute value of the rotation speed change rate ΔNm2 of the motor MG2 is compared with a threshold ΔNm2ref, thereby determining whether or not the rotation speed Nm2 of the motor MG2 is rapidly changed (Step S442). An absolute value of the voltage change rate ΔVH of the high voltage-side power line 54a is compared with a threshold ΔVHref, thereby determining whether or not the voltage VH of the high voltage-side power line 54a is rapidly changed (Step S444). An absolute value of the voltage change rate ΔVb of the battery 50 is compared with a threshold ΔVbref, thereby determining whether or not the voltage Vb of the battery 50 is rapidly changed (Step S446). The processing of Steps S440 to S446 can be performed (determined) in the same manner as the processing of Steps S410 to S416, except that the processing of Steps S440 to S446 is processing for determining whether or not the high controllability of the motor MG2, not the motor MG1, is requested.

In Steps S440 to S446, when the absolute value of the torque command change rate ΔTm2* is equal to or less than the threshold ΔTm2ref, the absolute value of the rotation speed change rate ΔNm2 is equal to or less than the threshold ΔNm2ref, the absolute value of the voltage change rate ΔVH is equal to or less than the threshold ΔVHref, and the absolute value of the voltage change rate ΔVb is equal to or less than the threshold ΔVbref, that is, when the drive state of the motor MG2 is not rapidly changed, determination is made that the high controllability of the motor MG2 is not requested (is secured in a needed level), and the value of 1 is set as the permission flag F2. That is, the execution of the second PWM control as the control of the inverter 42 is permitted (Step S450), and this routine ends.

When the absolute value of the torque command change rate ΔTm2* is greater than the threshold ΔTm2ref, when the absolute value of the rotation speed change rate ΔNm2 is greater than the threshold ΔNm2ref, when the absolute value of the voltage change rate ΔVH is greater than the threshold ΔVHref, or when the absolute value of the voltage change rate ΔVb is greater than the threshold ΔVbref, that is, when the drive state of the motor MG2 is rapidly changed, determination is made that the high controllability of the motor MG2 is requested (there is a possibility that the controllability of the motor MG2 is further degraded), the value of 0 is set as the permission flag F2. That is, the execution of the second PWM control as the control of the inverter 42 is inhibited (Step S460), and this routine ends.

As described above, in a case of executing the second PWM control as the control of the inverter 41, the controllability of the motor MG1 is likely to be degraded compared to a case of executing the first PWM control. For this reason, in a case where the second PWM control is executed as the control of the inverter 41 when the drive state of the motor MG1 is rapidly changed, there is a possibility that the controllability of the motor MG1 is further degraded and an overcurrent or an overvoltage occurs in the inverter 41. In this modification example, when the drive state of the motor MG1 is rapidly changed, determination is made that the high controllability of the motor MG1 is requested (there is a possibility that the controllability of the motor MG1 is further degraded), and as the control of the inverter 41, the execution of the second PWM control is inhibited and the first PWM control is executed. With this, it is possible to more sufficiently satisfy a request for the high controllability of the motor MG1. Specifically, it is possible to suppress the occurrence of an overcurrent or an overvoltage in the inverter 41. The control of the inverter 42 can be considered similarly.

Figure 9:
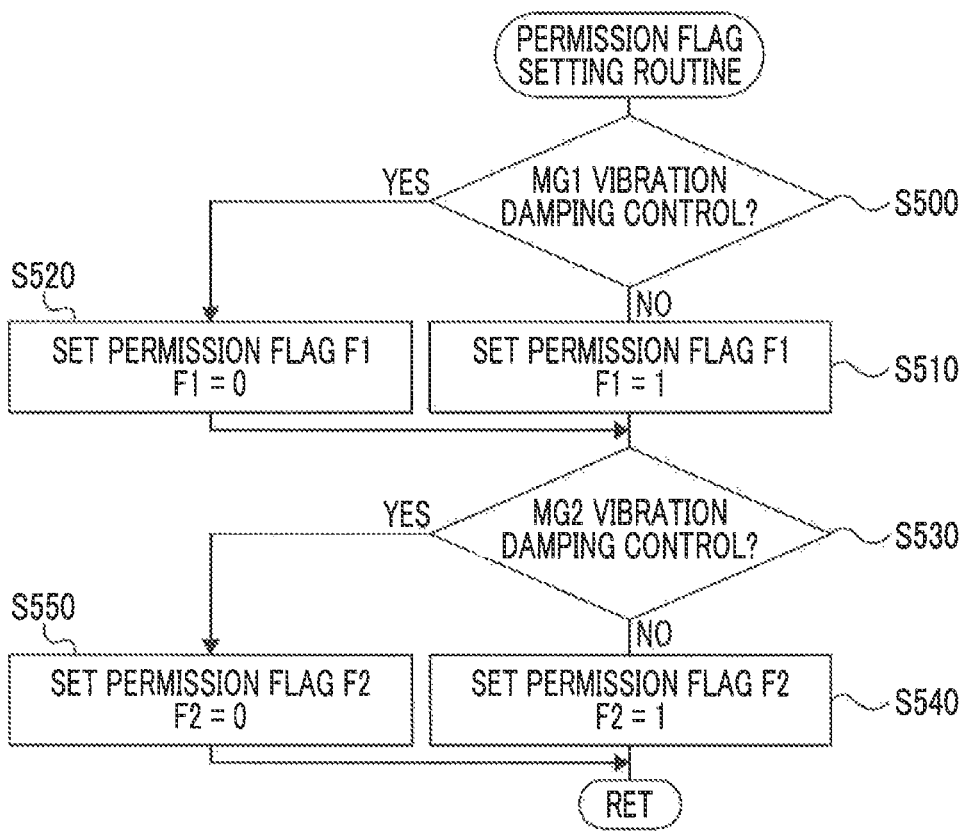
FIG. 9 is an explanatory view showing an example of a permission flag setting routine of a modification example.

Next, the permission flag setting routine of FIG. 9 will be described. In a case where the permission flag setting routine of FIG. 9 is executed, the motor ECU 40 first determines whether or not vibration damping control by the motor MG1 is performed (Step S500). The vibration damping control by the motor MG1 is performed, for example, when the engine 22 is started (when the engine 22 is started by cranking the engine 22 with the motor MG1), when fluctuation of rotation of the engine 22 is comparatively large during the operation of the engine 22, or the like. The processing of Step S500 can be performed by reading information regarding determination whether or not the vibration damping control by the motor MG1 is performed through a routine (not shown) and written in the RAM (not shown). Similarly to the processing of Step S200 of the permission flag setting routine of FIG. 6, the processing of Step S500 is processing for determining whether or not the high controllability of the motor MG1 is requested. When the vibration damping control by the motor MG1 is performed, in order to sufficiently exhibit vibration damping performance, the controllability of the motor MG1 may be further enhanced (is requested to be further enhanced). Accordingly, in this modification example, determination is made whether or not the vibration damping control by the motor MG1 is performed, thereby determining whether or not the high controllability of the motor MG1 is requested.

In Step S500, when the vibration damping control by the motor MG1 is not performed, determination is made that the high controllability of the motor MG1 is not requested (the controllability of the motor MG1 is not requested to be further enhanced), and the value of 1 is set as the permission flag F1. That is, the execution of the second PWM control as the control of the inverter 41 is permitted (Step S510). When the vibration damping control by the motor MG1 is performed, determination is made that the high controllability of the motor MG1 is requested (the controllability of the motor MG1 is requested to be further enhanced), and the value of 0 is set as the permission flag F1. That is, the execution of the second PWM control as the control of the inverter 41 is inhibited (Step S520).

In a case where the permission flag F1 is set in this manner, subsequently, determination is made whether or not vibration damping control by the motor MG2 is performed (Step S530). The vibration damping control by the motor MG2 is performed when the engine 22 is started, when fluctuation of rotation of the drive wheels 39a, 39b (drive shaft 36) is comparatively large, or the like. The processing of Step S530 can be performed (determined) in the same manner as the processing of Step S500, except that the processing of Step S530 is processing for determining whether or not the high controllability of the motor MG2, not the motor MG1, is requested.

In Step S530, when the vibration damping control by the motor MG2 is not performed, determination is made that the high controllability of the motor MG2 is not requested (the controllability of the motor MG2 is not requested to be further enhanced), and the value of 1 is set as the permission flag F2. That is, the execution of the second PWM control as the control of the inverter 42 is permitted (Step S540), and this routine ends. When the vibration damping control by the motor MG2 is performed, determination is made that the high controllability of the motor MG2 is requested (the controllability of the motor MG2 is requested to be further enhanced), and the value of 0 is set as the permission flag F2. That is, the execution of the second PWM control as the control of the inverter 42 is inhibited (Step S550), and this routine ends.

As described above, in a case of executing the second PWM control as the control of the inverter 41, the controllability of the motor MG1 is likely to be degraded compared to a case of executing the first PWM control. For this reason, in a case where the second PWM control is executed as the control of the inverter 41 when the vibration damping control of the motor MG1 is performed, there is a possibility that it is not possible to sufficiently exhibit the vibration damping performance. In this modification example, when the vibration damping control of the motor MG1 is performed, determination is made that the high controllability of the motor MG1 is requested (the controllability of the motor MG1 is requested to be further enhanced), and as the control of the inverter 41, the execution of the second PWM control is inhibited and the execution of the first PWM control is performed. With this, it is possible to more sufficiently satisfy a request for the high controllability of the motor MG1. Specifically, it is possible to sufficiently exhibit the vibration damping performance. The control of the inverter 42 can be considered similarly.

Figure 10:
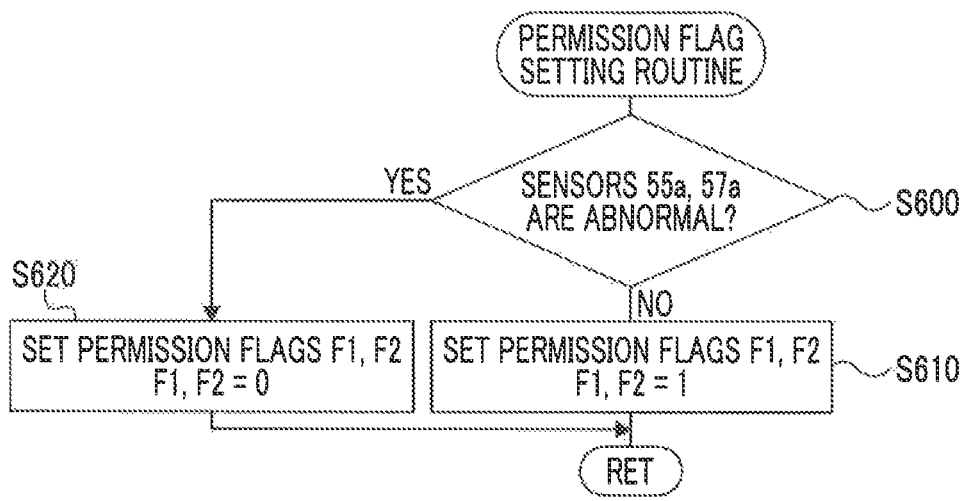
FIG. 10 is an explanatory view showing an example of a permission flag setting routine of a modification example.

Next, the permission flag setting routine of FIG. 10 will be described. In a case where the permission flag setting routine of FIG. 10 is executed, the motor ECU 40 first determines whether or not an abnormality occurs in the current sensor 55a that detects the current IL flowing in the reactor L or the voltage sensor 57a that detects the voltage VH of the high voltage-side power line 54a (capacitor 57) (Step S600). The processing of Step S600 can be performed by reading information regarding determination of the presence or absence of an abnormality in the current sensor 55a or the voltage sensor 57a through a routine (not shown) and written in the RAM (not shown). The processing of Step S600 is processing for determining whether or not the high controllability of the motors MG1, MG2 is requested. When an abnormality occurs in the current sensor 55a or the voltage sensor 57a, there is a possibility that the current IL of the reactor L from the current sensor 55a or the voltage VH of the high voltage-side power line 54a from the voltage sensor 57a is not a correct value or is not input, and there is a possibility that the controllability of the motors MG1, MG2 is further degraded. Accordingly, in this modification example, determination is made whether or not an abnormality occurs in the current sensor 55a or the voltage sensor 57a, thereby determining whether or not the high controllability of the motors MG1, MG2 is requested.

In Step S600, when an abnormality does not occur in both of the current sensor 55a and the voltage sensor 57a, determination is made that the high controllability of the motors MG1, MG2 is not requested (is secured in a needed level), and the value of 1 is set as the permission flags F1, F2. That is, the execution of the second PWM control as the control of the inverters 41, 42 is permitted (Step S610), and this routine ends. When an abnormality occurs in at least one of the current sensor 55a and the voltage sensor 57a, determination is made that the high controllability of the motors MG1, MG2 is requested (there is a possibility that the controllability of the motors MG1, MG2 is further degraded), and the value of 0 is set as the permission flags F1, F2. That is, the execution of the second PWM control as the control of the inverters 41, 42 is inhibited (Step S620), and this routine ends.

As described above, in a case of executing the second PWM control as the control of the inverters 41, 42, the controllability of the motors MG, MG2 is likely to be degraded compared to a case of executing the first PWM control. For this reason, in a case where the second PWM control is executed as the control of the inverters 41, 42 when an abnormality occurs in at least one of the current sensor 55a and the voltage sensor 57a, there is a possibility that the controllability of the motors MG1, MG2 is further degraded and an overcurrent or an overvoltage occurs in the inverters 41, 42. In this modification example, when an abnormality occurs in at least one of the current sensor 55a and the voltage sensor 57a, determination is made that the high controllability of the motors MG1, MG2 is requested (there is a possibility that the controllability of the motors MG1, MG2 is further degraded), and as the control of the inverters 41, 42, the execution of the second PWM control is inhibited and the first PWM control is executed. With this, it is possible to more sufficiently satisfy a request for the high controllability of the motors MG1, MG2. Specifically, it is possible to suppress the occurrence of an overcurrent or an overvoltage in the inverters 41, 42.

Figure 11:
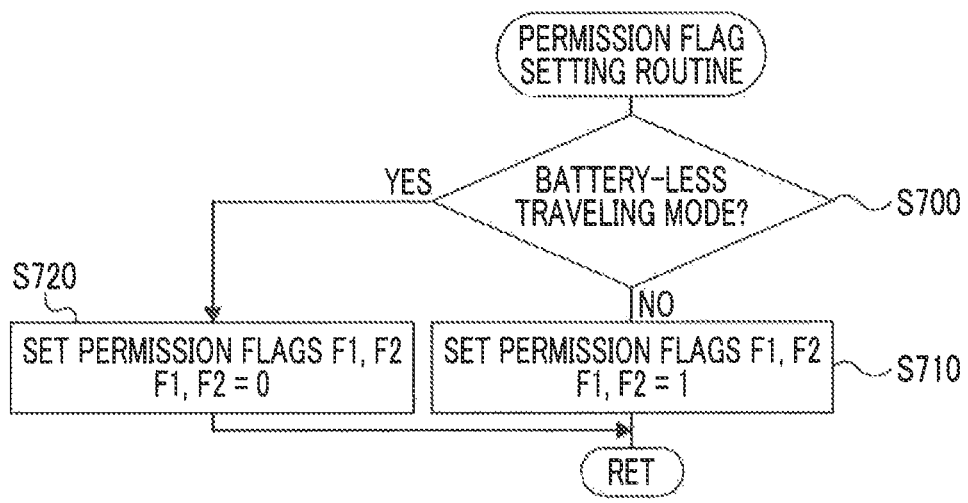
FIG. 11 is an explanatory view showing an example of a permission flag setting routine of a modification example.

Next, the permission flag setting routine of FIG. 11 will be described. In a case where the permission flag setting routine of FIG. 11 is executed, the motor ECU 40 determines whether or not a battery-less traveling mode is executed (Step S700). The battery-less traveling mode is a mode in which the system main relay 56 is turned off (the battery 50 is disconnected from the boost converter 55 side), the drive of the boost converter 55 is stopped, and traveling is performed with the drive of the engine 22 and the motors MG1, MG2. As a case where traveling is performed in the battery-less traveling mode, a case where an abnormality occurs in the battery 50, or the like can be exemplified. In the battery-less traveling mode, the HVECU 70 sets the requested torque Td* based on the accelerator operation amount Acc and the vehicle speed V. A rotation speed Ne1 is set as the target rotation speed Ne* of the engine 22. A voltage VH1 is set as the target voltage VH* of the high voltage-side power line 54a. The torque commands Tm1*, Tm2* of the motors MG1, MG2 are set such that the voltage VH of the high voltage-side power line 54a becomes the target voltage VH* and the requested torque Td* is output to the drive shaft 36. As the rotation speed Ne1, a rotation speed that enables efficient operation of the engine 22, or the like can be used. As the voltage VH1, a voltage that is slightly lower than an allowable upper limit voltage of the high voltage-side power line 54a (capacitor 57), or the like can be used. Then, the target rotation speed Ne* of the engine 22 is transmitted to the engine ECU 24, and the torque commands Tm1*, Tm2* of the motors MG1, MG2 are transmitted to the motor ECU 40. The engine ECU 24 performs the intake air amount control, the fuel injection control, the ignition control, and the like of the engine 22 such that the engine 22 rotates at the target rotation speed Ne*. The motor ECU 40 performs the switching control of the transistors T11 to T16, T21 to T26 of the inverters 41, 42 such that the motors MG1, MG2 are driven with the torque commands Tm1*, Tm2*.

The processing of Step S700 can be performed, for example, by reading information regarding determination of whether or not the battery-less traveling mode is executed through a routine (not shown) and written in the RAM (not shown). The processing of Step S700 is processing for determining whether or not the high controllability of the motors MG1, MG2 is requested. In a case of traveling in the battery-less traveling mode, since fluctuation of the sum of the electric power consumption of the motors MG1, MG2 cannot be absorbed with the battery 50, the sum of the electric power consumption (generated electric power) of the motors MG1, MG2 needs to be adjusted with higher accuracy compared to a case of traveling with the system main relay 56 being turned on, and the controllability of the motors MG1, MG2 needs to be further enhanced (is requested to be further enhanced). Accordingly, in this modification example, determination is made whether or not the battery-less traveling mode is executed, thereby determining whether or not the high controllability of the motors MG1, MG2 is requested.

In Step S700, when the battery-less traveling mode is not executed, determination is made that the high controllability of the motors MG1, MG2 is not requested (the controllability of the motors MG1, MG2 is not requested to be further enhanced), and the value of 1 is set as the permission flags F1, F2. That is, the execution of the second PWM control as the control of the inverters 41, 42 is permitted (Step S710), and this routine ends. When the battery-less traveling mode is executed, determination is made that the high controllability of the motors MG1, MG2 is requested (the controllability of the motors MG1, MG2 is requested to be further enhanced), and the value of 0 is set as the permission flags F1, F2. That is, the execution of the second PWM control as the control of the inverters 41, 42 is inhibited (Step S720), and this routine ends.

As described above, in a case of executing the second PWM control as the control of the inverters 41, 42, the controllability of the motors MG, MG2 is likely to be degraded compared to a case of executing the first PWM control. For this reason, in a case where the second PWM control is executed as the control of the inverters 41, 42 when the battery-less traveling mode is executed, there is a possibility that it is not possible to adjust the sum of the electric power consumption (generated electric power) of the motors MG1, MG2 with higher accuracy. In this modification example, when the battery-less traveling mode is executed, determination is made that the high controllability of the motors MG1, MG2 is requested (the controllability of the motors MG1, MG2 is requested to be further enhanced), and as the control of the inverters 41, 42, the execution of the second PWM control is inhibited and the first PWM control is executed. With this, it is possible to more sufficiently satisfy a request for the high controllability of the motors MG1, MG2. Specifically, it is possible to adjust the sum of the electric power consumption (generated electric power) of the motors MG1, MG2 with higher accuracy.

Figure 12:
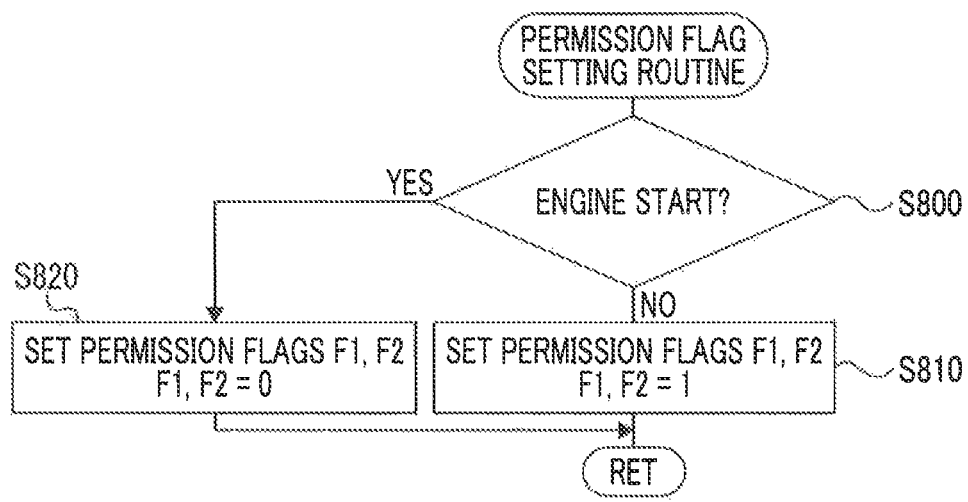
FIG. 12 is an explanatory view showing an example of a permission flag setting routine of a modification example.

Next, the permission flag setting routine of FIG. 12 will be described. In a case where the permission flag setting routine of FIG. 12 is executed, the motor ECU 40 determines whether or not the engine 22 is started (the engine 22 is started by cranking the engine 22 with the motor MG1) (Step S800). The processing of Step S800 can be performed, for example, by reading information regarding determination of whether or not the engine 22 is started through a routine (not shown) and written in the RAM (not shown). The processing of Step S800 is processing for determining whether or not the high controllability of the motors MG1, MG2 is requested. When the engine 22 is started, since the rotation speed Nm1 or the torque Tm1 (torque for cranking the engine 22) of the motor MG1 is rapidly changed or the torque Tm2 of the motor MG2 is rapidly changed in order to secure the requested torque Td* due to rapid change in torque output from the motor MG1 and applied to the drive shaft 36 through the planetary gear 30, there is a possibility that the controllability of the motors MG1, MG2 is further degraded. Accordingly, in this modification example, determination is made whether or not the engine 22 is started, thereby determining whether or not the high controllability of the motors MG1, MG2 is requested.

In Step S800, when the engine 22 is not started, determination is made that the high controllability of the motors MG1, MG2 is not requested (is secured in a needed level), and the value of 1 is set as the permission flags F1, F2. That is, the execution of the second PWM control as the control of the inverters 41, 42 is permitted (Step S810), and this routine ends. When the engine 22 is started, determination is made that the high controllability of the motors MG1, MG2 is requested (there is a possibility that the controllability of the motors MG1, MG2 is further degraded), and the value of 0 is set as the permission flags F1, F2. That is, the execution of the second PWM control as the control of the inverters 41, 42 is inhibited (Step S820), and this routine ends.

As described above, in a case of executing the second PWM control as the control of the inverters 41, 42, the controllability of the motors MG1, MG2 is likely to be degraded compared to a case of executing the first PWM control. For this reason, in a case where the second PWM control is executed as the control of the inverters 41, 42 when the engine 22 is started, there is a possibility that the controllability of the motors MG1, MG2 is further degraded and an overcurrent or an overvoltage occurs in the inverters 41, 42. In this modification example, when the engine 22 is started, determination is made that the high controllability of the motors MG1, MG2 is requested (there is a possibility that the controllability of the motors MG1, MG2 is further degraded), and as the control of the inverters 41, 42, the execution of the second PWM control is inhibited and the first PWM control is executed. With this, it is possible to more sufficiently satisfy a request for the high controllability of the motors MG1, MG2. Specifically, it is possible to suppress the occurrence of an overcurrent or an overvoltage in the inverters 41, 42.

In the hybrid vehicle 20 of the example or the modification examples, as described in the permission flag setting routines of FIGS. 6 to 12, as the condition for setting the value of 0 as the permission flag F1 (inhibiting the execution of the second PWM control as the control of the inverter 41), the following conditions are used. In the permission flag setting routine of FIG. 6, (A) the condition that the zero learning of at least one of the rotation position detection sensor 43 and the current sensors 45u, 45v is not completed is used. In the routine of FIG. 7, (B) the condition that an abnormality occurs in at least one of the rotation position detection sensor 43 and the current sensors 45u, 45v is used. In the routine of FIG. 8, (C) the condition that the drive state of the motor MG1 is rapidly changed is used. In the routine of FIG. 9, (D) the condition that the vibration damping control by the motor MG1 is performed is used. In the routine of FIG. 10, (E) the condition that an abnormality occurs in at least one of the current sensor 55a and the voltage sensor 57a is used. In the routine of FIG. 11, (F) the condition that the battery-less traveling mode is executed is used. In the routine of FIG. 12, (G) the condition that the engine 22 is started is used. However, some or all of the conditions (A) to (G) may be used in combination. For example, in a case where all of the conditions (A) to (G) are used in combination, when at least one of the conditions (A) to (G) is established, the value of 0 may be set as the permission flag F1. The permission flag F2 can be considered similarly.

In the hybrid vehicle 20 of the example, when the high controllability of the motor MG1 is requested, the execution of the second PWM control as the control of the inverter 41 is inhibited (the first PWM control is executed); however, the execution of the second PWM control may be limited. For example, as the control of the inverter 41, the execution of the second PWM control other than the area 1 (see FIG. 5) in the area of the second PWM control may be inhibited. Alternatively, the execution of the second PWM control other than a case where cruise traveling is performed in the area of the second PWM control may be inhibited. The control of the inverter 42 can be considered similarly.

The hybrid vehicle 20 of the example includes the engine ECU 24, the motor ECU 40, the battery ECU 52, and the HVECU 70. However, some or all of the components may be constituted as a single electronic control unit.

In the hybrid vehicle 20 of the example, although the battery 50 is used as an electric power storage device, a capacitor may be used.

In the hybrid vehicle 20 of the example, although the boost converter 55 is provided between the inverters 41, 42 and the battery 50, the boost converter 55 may not be provided.

Figure 13:
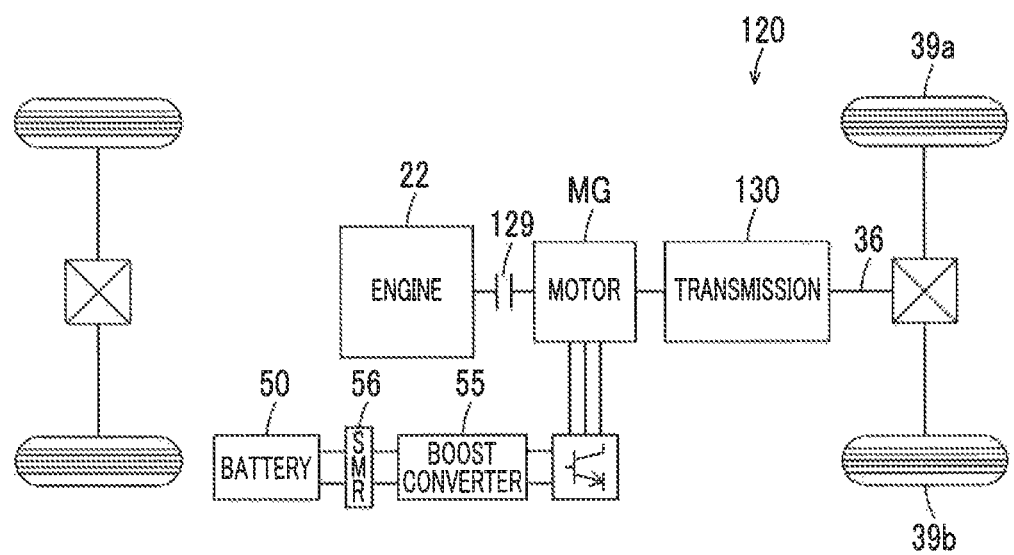
FIG. 13 is a configuration diagram showing the outline of the configuration of a hybrid vehicle of a modification example.
Figure 14:
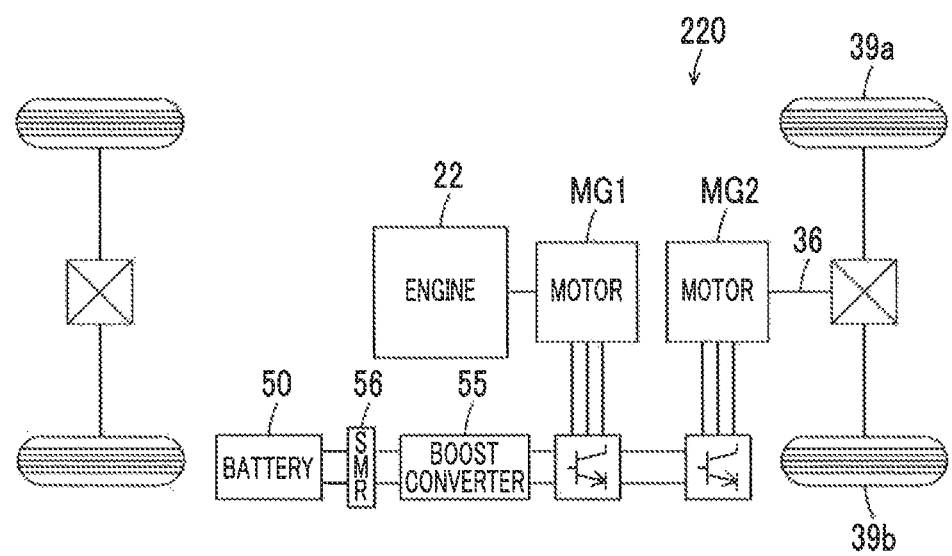
FIG. 14 is a configuration diagram showing the outline of the configuration of a hybrid vehicle of a modification example.
Figure 15:
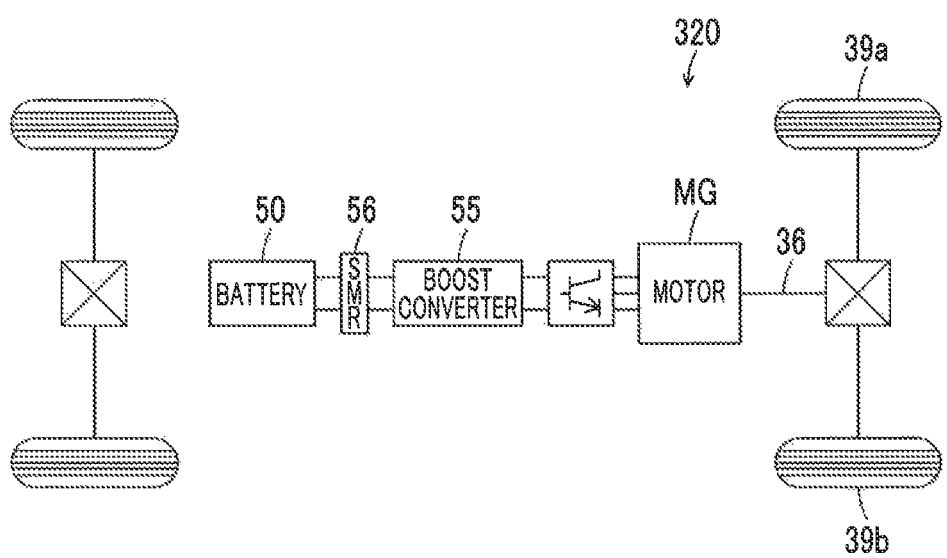
FIG. 15 is a configuration diagram showing the outline of the configuration of an electric vehicle of a modification example.

In the hybrid vehicle 20 of the example, the engine 22 and the motor MG1 are connected to the drive shaft 36 coupled to the drive wheels 39a, 39b through the planetary gear 30, and the motor MG2 is connected to the drive shaft 36. However, as shown in a hybrid vehicle 120 of a modification example of FIG. 13, a motor MG may be connected to the drive shaft 36 coupled to the drive wheels 39a, 39b through a transmission 130, and the engine 22 may be connected to a rotational shaft of the motor MG through a clutch 129. As shown in a hybrid vehicle 220 of a modification example of FIG. 14, a configuration of a so-called series hybrid vehicle may be made in which a motor MG2 for traveling may be connected to the drive shaft 36 coupled to the drive wheels 39a, 39b, and a motor MG1 for electric power generation may be connected to an output shaft of the engine 22. As shown in an electric vehicle 320 of a modification example of FIG. 15, a configuration of an electric vehicle may be made in which a motor MG for traveling may be connected to the drive shaft 36 coupled to the drive wheels 39a, 39b. In a case of the configuration of the electric vehicle 320, the motor ECU 40 can execute the permission flag setting routines of FIGS. 6 to 10 among the permission flag setting routines of FIGS. 6 to 12.

An applicable embodiment is not limited to such a vehicle, and may be applied to a drive device that is mounted in a mobile object, such as a vehicle, or may be applied to a drive device that is embedded in a facility, such as a construction facility, not a mobile object.

The correspondence relationship between the primary components of the example and the primary components described in "SUMMARY" will be described. In the example, the motor MG2 corresponds to a "motor", the inverter 42 corresponds to an "inverter", the battery 50 corresponds to an "electric power storage device", and the motor ECU 40 corresponds to an "electronic control unit".

The correspondence relationship between the primary components of the example and the primary components described in "SUMMARY" should not be considered to limit the components described in "SUMMARY" since the example is solely illustrative to specifically describe the aspects of the present disclosure. That is, the present disclosure described in "SUMMARY" should be interpreted based on the description in "SUMMARY", and the example is only a specific example of the present disclosure described in "SUMMARY".

Although the mode for carrying out the present disclosure has been described above in connection with the example, an applicable embodiment is not limited to the example, and can be of course carried out in various forms without departing from the spirit and scope of the present disclosure.

The present disclosure is usable in a manufacturing industry of a drive device and a vehicle, or the like.

What is claimed is:

1. A drive device comprising:
   a motor for traveling;
   an inverter configured to drive the motor by switching a plurality of switching elements;
   an electric power storage device configured to transmit and receive electric power to and from the motor through the inverter; and
   an electronic control unit configured to:
   generate a first pulse width modulation signal of the switching elements in a first time interval Δt1 by comparison of a voltage command of each phase according to a torque command of the motor and a carrier wave voltage and switch the switching elements with the first pulse width modulation signal, as a first pulse width modulation control;
   generate a second pulse width modulation signal of the switching elements in a second time interval Δt2, the second time interval Δt2 being longer than the first time interval Δt1, by extending a generation cycle of a pulse width modulation signal to be longer in a second pulse width modulation control than in the first pulse width modulation control based on a modulation factor and a voltage phase of a voltage according to the torque command and a pulse count per unit cycle of an electric angle of the motor and switch the switching elements with the second pulse width modulation signal, as the second pulse width modulation control, a switching frequency in per unit cycle of an electric angle of the motor of the switching elements in the second pulse width modulation control being set to be smaller than a switching frequency in per unit cycle of an electric angle of the motor of the switching elements in the first pulse width modulation control; and limit execution of the second pulse width modulation control when high controllability of the motor is requested rather than when the high controllability is not requested, wherein the electronic control unit is configured to:

permit the execution of the second pulse width modulation control when the high controllability is not requested, and to inhibit the execution of the second pulse width modulation control when the high controllability is requested, execute the first pulse width modulation control when a target operation point of the motor is outside a predetermined area even in a case where the high controllability is not requested and the execution of the second pulse width modulation control is permitted, and generate the second pulse width modulation signal of the switching elements such that, in the second pulse width modulation control, a harmonic component of a desired order is reduced and a total loss of loss of the motor and loss of the inverter is reduced more than in the first pulse width modulation control.

2. The drive device according to claim 1, further comprising:

a rotation position detection sensor configured to detect a rotation position of a rotor of the motor; and a current sensor configured to detect a current flowing in the motor, wherein the electronic control unit is configured to determine that the high controllability is requested when zero learning of at least one of the rotation position detection sensor and the current sensor is not completed.

3. The drive device according to claim 1, further comprising:

a rotation position detection sensor configured to detect a rotation position of a rotor of the motor; and a current sensor configured to detect a current flowing in the motor, wherein the electronic control unit is configured to determine that the high controllability is requested when an abnormality occurs in at least one of the rotation position detection sensor and the current sensor.

4. The drive device according to claim 1, wherein the electronic control unit is configured to determine that the high controllability is requested when an amount of change per unit time of at least one of the torque command of the motor, a rotation speed of the motor, a voltage of the inverter, and a voltage of the electric power storage device is greater than a corresponding threshold.

5. The drive device according to claim 1, wherein the electronic control unit is configured to determine that the high controllability is requested when vibration damping control by the motor is performed.

6. The drive device according to claim 1, further comprising:

a boost converter configured to boost electric power from the electric power storage device and to supply electric power to the inverter;

a current sensor configured to detect a current flowing in a reactor of the boost converter; and a voltage sensor configured to detect a voltage on the inverter from the boost converter, wherein the electronic control unit is configured to determine that the high controllability is requested when an abnormality occurs in at least one of the current sensor and the voltage sensor.

7. A vehicle comprising:

the drive device according to claim 1;

drive wheels that are connected to the motor and driven;

an engine;

a power generator configured to generate electric power using power from the engine;

an inverter for a power generator configured to drive the power generator by switching a plurality of second switching elements; and a relay configured to perform connection and disconnection of the inverter and the inverter for a power generator to and from the electric power storage device, wherein:

the electronic control unit is configured to control the inverter for a power generator by switching the first pulse width modulation control and the second pulse width modulation control;

the electronic control unit is configured to determine that the high controllability of the motor and the power generator is requested in a case of performing traveling by disconnecting the inverter and the inverter for a power generator from the electric power storage device by the relay; and the electronic control unit is configured to limit the execution of the second pulse width modulation control when the high controllability of the power generator is requested rather than when the high controllability is not requested.

8. A vehicle comprising:

the drive device according to claim 1;

drive wheels that are connected to the motor and driven;

an engine;

a motor generator;

a planetary gear including three rotating elements, the three rotating elements of the planetary gear being connected to an output shaft of the engine, a rotational shaft of the motor generator, and a drive shaft coupled to an axle, respectively; and an inverter for a motor generator configured to drive the motor generator by switching a plurality of second switching elements, wherein:

the electric power storage device is connected to the motor and the motor generator through the inverter and the inverter for a motor generator so as to transmit and receive electric power to and from the motor and the motor generator;

the electronic control unit is configured to control the inverter for a motor generator by switching the first pulse width modulation control and the second pulse width modulation control;

the electronic control unit is configured to determine that the high controllability of the motor and the motor generator is requested in a case of starting the engine by cranking the engine with the motor generator; and the electronic control unit is configured to limit the execution of the second pulse width modulation control when the high controllability of the motor generator is requested rather than when the high controllability is not requested.

* * * * *

UNITED STATES PATENT AND TRADEMARK OFFICE
CERTIFICATE OF CORRECTION

| | |
|---|---|
| PATENT NO. | : 11,358,476 B2 |
| APPLICATION NO. | : 15/724520 |
| DATED | : June 14, 2022 |
| INVENTOR(S) | : Kiyotaka Matsubara et al. |

It is certified that error appears in the above-identified patent and that said Letters Patent is hereby corrected as shown below:

On the Title Page

Item (73), should read as follows:
(73) Assignee: DENSO CORPORATION, Kariya (JP)

Signed and Sealed this
Seventeenth Day of September, 2024

Katherine Kelly Vidal
*Director of the United States Patent and Trademark Office*